(12) United States Patent
Ding et al.

(10) Patent No.: US 11,503,397 B2
(45) Date of Patent: Nov. 15, 2022

(54) SYSTEM FOR CHARGING WIRELESS DEVICES

(71) Applicant: Google LLC, Mountain View, CA (US)

(72) Inventors: Yao Ding, San Jose, CA (US); Kenneth Albanowski, Fremont, CA (US); Maksim Shmukler, San Jose, CA (US); Trevor Hermosillo, Santa Clara, CA (US); Chi Kin Benjamin Leung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 712 days.

(21) Appl. No.: 16/327,975

(22) PCT Filed: Sep. 7, 2018

(86) PCT No.: PCT/US2018/049931
§ 371 (c)(1),
(2) Date: Feb. 25, 2019

(87) PCT Pub. No.: WO2020/050853
PCT Pub. Date: Mar. 12, 2020

(65) Prior Publication Data
US 2020/0213705 A1 Jul. 2, 2020

(51) Int. Cl.
*H04R 1/10* (2006.01)
*H02J 50/90* (2016.01)
(Continued)

(52) U.S. Cl.
CPC .......... *H04R 1/1025* (2013.01); *H02J 7/0045* (2013.01); *H02J 50/005* (2020.01);
(Continued)

(58) Field of Classification Search
CPC ........ H02J 50/90; H02J 50/005; H02J 7/0045; H02J 2310/22; H02J 7/0013;
(Continued)

(56) References Cited

U.S. PATENT DOCUMENTS 9,941,730 B1  4/2018  Kim et al.
2008/0303486 A1 * 12/2008  Kao .................. H02J 7/0021
                                                  320/139

(Continued)

FOREIGN PATENT DOCUMENTS

WO    WO-2017074300 A1 *  5/2017  .......... G06F 1/1698

OTHER PUBLICATIONS

International Search Report and Written Opinion for PCT Application No. PCT/US2018/049931, dated Nov. 9, 2018. 18 pages.

(Continued)

*Primary Examiner* — David V Henze-Gongola
(74) *Attorney, Agent, or Firm* — Colby Nipper PLLC

(57) ABSTRACT

A case (100) is provided for housing and charging one or more wireless devices (180), such as wireless earbuds. The case (100) includes capacitive sensing circuitry (120) for detecting whether the wireless devices (180) are positioned inside the case (100) based on a capacitance of the wireless devices (180). The case (100) also includes a transceiver (150) for transmitting data to and receiving data from the wireless devices (180). When the wireless devices (180) are positioned inside the case (100), an electrical component (110) inside the case operatively connects the capacitive sensing circuitry (120) and the transceiver (150) of the case (100) to the wireless devices (180). The case (100) further includes one or more processors (140) for controlling the capacitive sensing circuitry (120), the transceiver (150), and the electrical component (110).

20 Claims, 10 Drawing Sheets

(51) Int. Cl.
*H02J 50/00* (2016.01)
*H02J 7/00* (2006.01)

(52) U.S. Cl.
CPC ............ *H02J 50/90* (2016.02); *H04R 1/1016* (2013.01); *H02J 2310/22* (2020.01)

(58) Field of Classification Search
CPC .... H02J 7/00034; H02J 7/00038; H02J 9/005; H02J 7/0044; H02J 7/0036; H02J 7/342; H04R 1/1025; H04R 1/1016; H04R 2460/17; A45C 2011/002; A45C 15/00
See application file for complete search history.

(56) References Cited

U.S. PATENT DOCUMENTS

| | | | |
|---|---|---|---|
| 2015/0245127 A1* | 8/2015 | Shaffer | H04R 1/1025 381/380 |
| 2016/0073188 A1* | 3/2016 | Linden | H04R 1/1025 381/309 |
| 2016/0234778 A1* | 8/2016 | Gaja | H04W 52/0206 |
| 2018/0091887 A1* | 3/2018 | Minoo | H04R 1/1025 |
| 2018/0115816 A1 | 4/2018 | Panecki et al. | |
| 2020/0084532 A1* | 3/2020 | Lo | H02J 7/342 |

OTHER PUBLICATIONS

International Preliminary Report on Patentability for International Application No. PCT/US2018/049931 dated Mar. 18, 2021. 11 pages.

\* cited by examiner

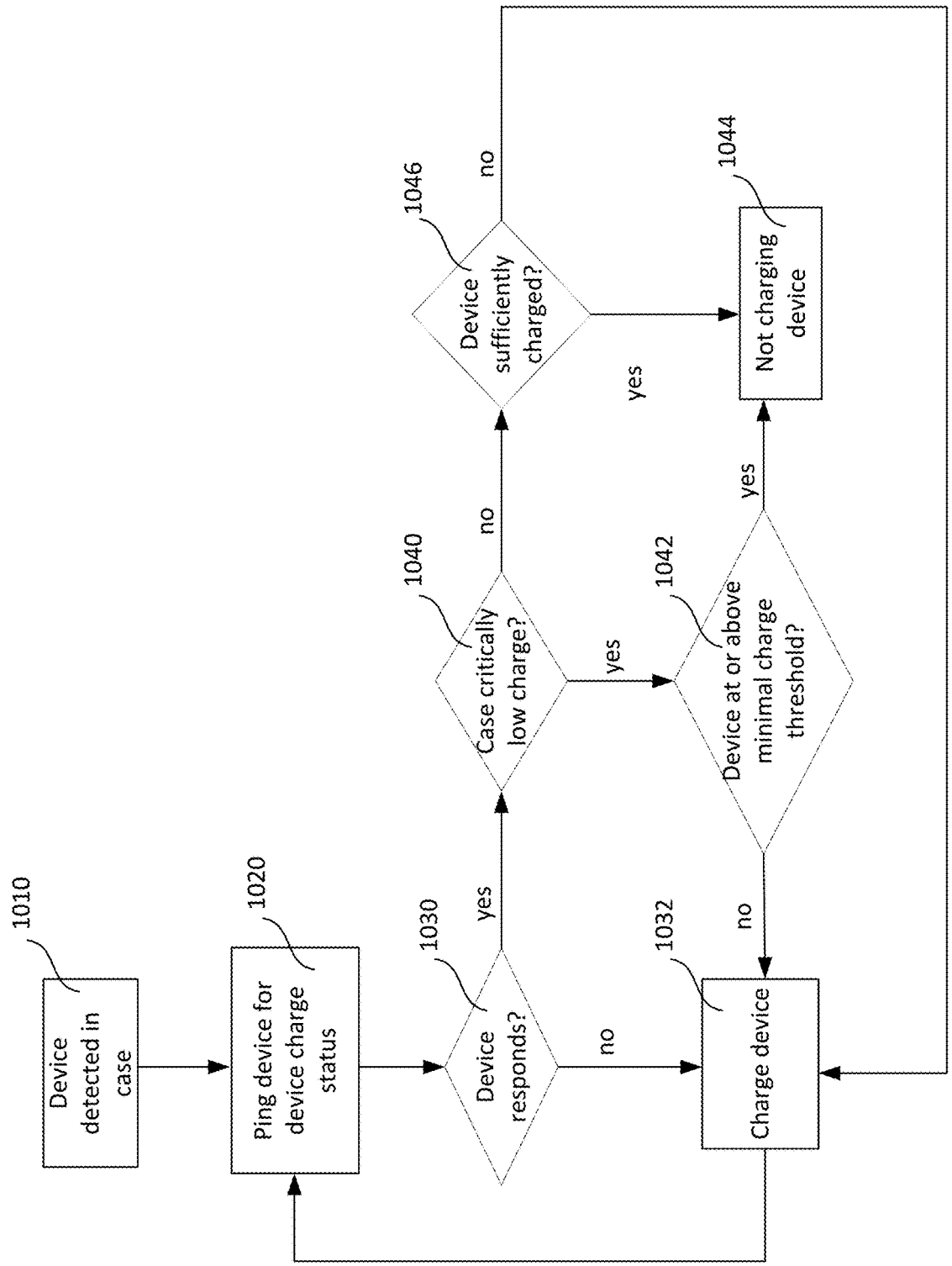

SYSTEM FOR CHARGING WIRELESS DEVICES

CROSS-REFERENCE TO RELATED APPLICATION

This application is a national phase entry under 35 U.S.C. § 371 of International Application No. PCT/US2018/049931, filed Sep. 7, 2018, the entire disclosure of which is incorporated herein by reference.

BACKGROUND

Wireless devices typically require one or more batteries, such as a rechargeable battery, that provides power to the wireless device. Such rechargeable batteries need to be periodically recharged or replaced. Cases for housing wireless devices can be configured to charge the batteries of the wireless devices and to communicate with the wireless devices. As such, electrical components like wires and contacts are often needed for enabling communication and charging. However, such electrical components, when kept active for extended periods of time, may cause energy to be dissipated and become more prone to corrosion.

Electrical and mechanical sensors can be used to detect conditions of the cases and the wireless devices. Such sensors can also consume significant amounts of energy when kept active for extended periods of time.

BRIEF SUMMARY

The present disclosure provides for a case configured for charging one or more wireless devices, the case comprising capacitive sensing circuitry configured for detecting whether the one or more wireless devices are positioned inside the case; a transceiver configured for transmitting data to and receiving data from the one or more wireless devices; an electrical component operatively connected to the capacitive sensing circuitry and to the transceiver, wherein, when the one or more wireless devices are positioned inside the case, the electrical component is configured to operatively connect the capacitive sensing circuitry and the transceiver to the one or more wireless devices; and one or more processors configured to control the capacitive sensing circuitry, the transceiver, and the electrical component; wherein the one or more processors are configured to determine whether to charge the one or more wireless devices based on a detection of the capacitive sensing circuitry and data received by the transceiver.

The case may further comprise a sensor configured to detect whether the case is open or closed; wherein the one or more processors may be configured to activate the capacitive sensing circuitry when the case is detected to be open and deactivate the capacitive sensing circuitry when the case is detected to be closed. The one or more processors may be configured to set a sampling rate of the capacitive sensing circuitry to a predetermined low sampling rate when the one or more wireless devices are detected to be positioned inside the case, and set the sampling rate of the capacitive sensing circuitry to a predetermined high sampling rate when the one or more wireless devices are not detected to be positioned inside the case.

When the one or more wireless devices are detected by the capacitive sensing circuitry as being inside the case, the one or more processors may be configured to enable communication by activating the transceiver and the electrical component for transmitting data to or receiving data from the one or more wireless devices. The one or more processors may be configured to control the transceiver to initiate communication with the one or more wireless devices when detection data from the capacitive sensing circuitry indicate that the one or more wireless devices have been positioned inside the case for a predetermined period of time.

The data received by the transceiver may include whether the one or more wireless devices are in a working mode or a factory mode; wherein the one or more processors may be configured to set a communication rate of the transceiver to a predetermined high communication rate when the one or more wireless devices are in a working mode, and set the communication rate of the transceiver to a predetermined low communication rate when the one or more wireless devices are in a factory mode. The data received by the transceiver may include a charge status of the one or more wireless devices.

The one or more processors may be configured to set a communication rate of the transceiver to a predetermined high communication rate when the charge status indicates that the one or more wireless devices are below a predetermined sufficient charge threshold, and set the communication rate of the transceiver to a predetermined low communication rate when the charge status indicates that the one or more wireless devices are at or above the predetermined sufficient charge threshold. The one or more processors may be configured to set a communication rate of the transceiver to a predetermined high communication rate while the one or more wireless devices are being charged inside the case, and set the communication rate of the transceiver to a predetermined low communication rate while the one or more wireless devices are not being charged inside the case.

When the one or more wireless devices do not respond to communication, the one or more processors may be configured to activate charging for the one or more wireless devices. When the charge status indicates that the one or more wireless devices are below a predetermined sufficient charge threshold, the one or more processors may be configured to activate charging for the one or more wireless devices. The one or more processors may be configured to determine that a charge status of the case is below a predetermined critically low charge threshold, and to stop charging of the one or more wireless devices when the one or more wireless devices are charged to a predetermined minimal charge threshold.

The case may further comprise a sensing line operatively connecting the capacitive sensing circuitry to the electrical component; and an input/output line connecting the one or more processors to the electrical component; wherein the input/output line at least partially overlaps the sensing line. The one or more processors may be configured to deactivate the electrical component by sending a high-impedance signal to the input/output line.

The case may further comprise a pull-up resistor operatively connecting an output of the one or more processors to the electrical component and operatively connecting the capacitive sensing circuitry to the electrical component; a pull-down resistor connecting the electrical component to a ground, the ground being shared with the one or more wireless devices; and wherein the pull-down resistor has a resistance value at least one order of magnitude greater than the pull-up resistor.

The disclosure further provides for a system, comprising a case for charging one or more wireless devices, the case comprising capacitive sensing circuitry configured for detecting whether the one or more wireless devices are positioned inside the case, a first transceiver configured for transmitting data to and receiving data from the one or more wireless devices, an electrical component operatively connected to the capacitive sensing circuitry and to the transceiver, wherein, when the one or more wireless devices are positioned inside the case, the electrical component is configured to operatively connect the capacitive sensing circuitry and the transceiver to the one or more wireless devices, and one or more processors configured to control the capacitive sensing circuitry, the transceiver, and the electrical component, wherein the one or more processors are configured to determine whether to charge the one or more wireless devices based on a detection of the capacitive sensing circuitry and data received by the transceiver; and the one or more wireless devices, comprising a second transceiver for transmitting data to and receiving data from the case.

The one or more wireless devices of the system may further comprise a second capacitive sensing circuitry configured to detect whether the one or more wireless devices are positioned inside the case; wherein, when the second capacitive sensing circuitry detects that the one or more wireless devices are positioned inside the case, the second transceiver of the one or more wireless devices are configured to initiate communication with the first transceiver of the case.

The disclosure yet further provides for method for charging one or more wireless devices by a case, the method comprising activating, by one or more processors, capacitive sensing circuitry to detect whether the one or more wireless devices are positioned inside the case; activating, by the one or more processors, a transceiver to initiate communication between the case and the one or more wireless devices upon detecting that the one or more wireless devices are positioned inside the case; receiving, from the one or more wireless devices, a charge status of the one or more wireless devices; and determining, by the one or more processors, whether to charge the one or more wireless devices based on the charge status of the one or more wireless devices.

The method may further comprise activating, by the one or more processors, a sensor for detecting whether the case is open or closed; and adjusting, by the one or more processors, a sampling rate of the capacitive sensing circuitry based on whether the case is open or closed. The method may further comprise adjusting, by the one or more processors, a communication rate of the transceiver based on the charge status of the one or more wireless devices.

BRIEF DESCRIPTION OF THE DRAWINGS

FIG. 10 is an example flow diagram illustrating another example method in accordance with aspects of the disclosure.

DETAILED DESCRIPTION

Overview

Figure 1:
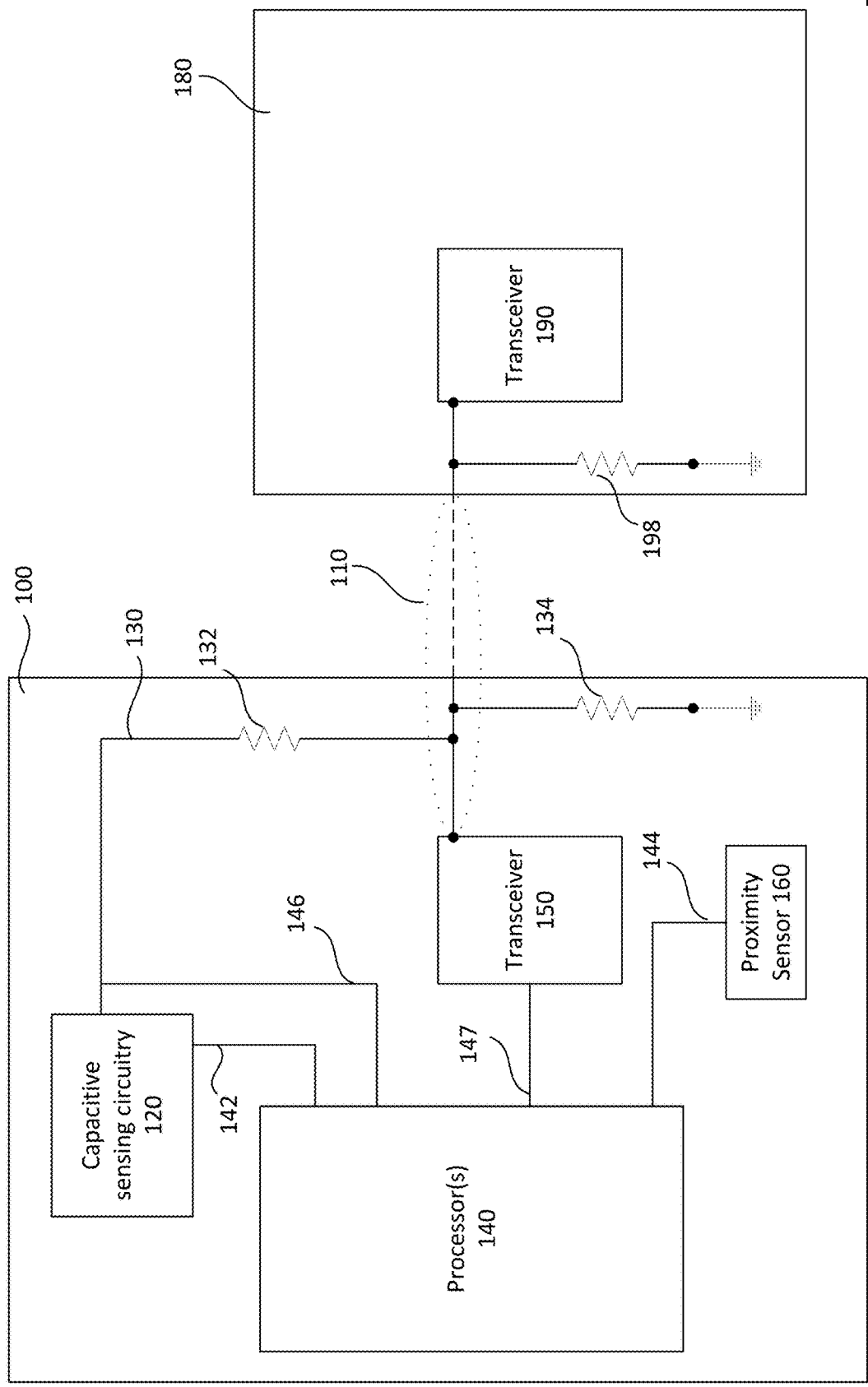
FIG. 1 illustrates an example system in accordance with aspects of the disclosure.

The technology generally relates to a case for housing and charging one or more wireless devices, such as wireless earbuds. The case includes capacitive sensing circuitry for detecting whether the wireless devices are positioned inside the case based on a capacitance of the wireless devices. The case also includes a transceiver for transmitting data to and receiving data from the wireless devices. When the wireless devices are positioned inside the case, an electrical component inside the case operatively connects the capacitive sensing circuitry and the transceiver of the case to the wireless devices. The case further includes one or more processors for controlling the capacitive sensing circuitry, the transceiver, and the electrical component. For example, the one or more processors may be configured to control a sampling rate of the capacitive sensing circuitry, a communication rate of the transceiver, and/or charging of the wireless devices.

The capacitive sensing circuitry has a sensing line connected to the electrical component. In this regard, the capacitive sensing circuitry may send sensing pulses through the sensing line to the electrical component. When there are no wireless devices positioned inside the case, the capacitive sensing circuitry may detect a capacitance from the circuitry of the case itself (for example, from the transceiver of the case). In contrast, when the one or more wireless devices are positioned inside the case such that the electrical component operatively connects the one or more wireless devices to the capacitive sensing circuitry, the capacitive sensing circuitry may detect an additional capacitance from the wireless devices. Because this additional capacitance results from the mere existence of the circuitry inside the wireless devices, the presence of the wireless devices may be detected even if the wireless devices are completely out of charge or powered off. Additionally, a strong pull-up resistor may be implemented on the sensing line to provide a logic 1 signal during communication, and provide protection to capacitive sensing line from electrostatic discharge, and a weak pull-down resistor may be implemented to connect the electrical component to a ground, which sets the input level for wireless device to logic 0 when it's not connected to the case.

The one or more processors control the capacitive sensing circuitry by generating a control signal to the capacitive sensing circuitry. The control signal may allow the capacitive sensing circuitry to send sensing pulses through the sensing line, and also receive a capacitance detection through the sensing line. The one or more processors may further control a sampling rate of the sensing pulses based on a state of the case. For example, the capacitance sensing circuitry may be configured to send the sensing pulses at a predetermined low sampling rate when the case is in a standby state to conserve energy, and at a predetermined high sampling rate when the case is in an active state to reduce detection latency. As another example, the capacitance sensing circuitry may be configured to send the sensing pulses at a predetermined low sampling rate, or even halt the sensing, when the case is closed, since it may be assumed that no wireless devices can be placed into or taken out of the case, or send the sensing pulses at a predetermined high sampling rate if the case is open, since it may be likely that the wireless devices will be placed inside or taken out of the case at some point while it is open. In this regard, the case may additionally include a proximity sensor, such as a Hall Effect sensor, for detecting whether the case is open or closed. As yet another example, the capacitive sensing circuitry may be configured to send the sensing pulses at a predetermined low sampling rate when the wireless devices are detected, since it may be assumed that the wireless devices were inserted for charging or storage for at least some period of time, and at a predetermined high sampling rate when the wireless devices are not detected, thus reducing latency of detecting insertion of the wireless devices.

The transceiver can transmit data to and receive data from the wireless devices when the wireless devices are connected to the electrical component. The transceiver may be implemented for half duplex communication such that the transceiver is either transmitting data to or receiving data from the wireless devices through the electrical component, but not both at the same time. A strong pull-up resistor may be implemented on an input/output line of the case to provide a logic "1" to the transceiver. The input/output line of the case may have a portion that overlaps the sensing line of the capacitive sensing circuitry, or may be implemented as a completely separate line. The weak pull-down resistor connecting the electrical component to the ground may set logic "0" to the input line when the wireless devices are not inside the case or powered off. The pull-up resistor may be selected to be much stronger (lower resistance) than the weak pull-down resistor (higher resistance).

The one or more processors control the transceiver by generating a control signal to the input/output line. The control signal may be a logic 1 signal that enables communication between the transceiver of the case and a transceiver of the wireless devices through the electrical component. The one or more processors may further control a direction and a frequency of communication by the transceiver. For example, the transceiver may be configured to ping the wireless devices at a predetermined low communication rate when the wireless devices are sufficiently charged, and at a predetermined high communication rate when the wireless devices are not sufficiently charged or are unable to respond to communication. As another example, the transceiver may be configured to ping the wireless devices at a predetermined low communication rate when the wireless devices are or had been in factory mode, or at a predetermined low communication rate when the wireless devices are or had been in working mode. As yet another example, the transceiver may be configured to ping the wireless devices based on detection data from the capacitive sensing circuitry indicating that the wireless devices had been positioned in the case for some period of time, and thus might have been discharged. As still another example, the transceiver may be configured to ping the wireless devices at a predetermined high communication rate when the case is open, and at a predetermined low communication rate when the case is closed.

The one or more processors may control charging of the wireless devices based on a detection of the wireless devices by the capacitive sensing circuitry and data received by the transceiver, which may include battery life information. For example, the one or more processors may be configured to enable charging whenever the wireless devices are not fully charged, or only when the wireless devices not sufficiently charged to a predetermined sufficient charge threshold. As another example, the one or more processors may control an extent to charge the wireless devices based on a charge status of the case, so that if the case has a critically low charge, the wireless devices are only charged up to a predetermined minimal charge threshold. As yet another example, the one or more processors may control charging based on detection data from the capacitive sensing circuitry indicating that the wireless devices had been positioned in the case for some period of time, and thus might have been discharged. The charging may be done through the electrical component or a separate connection between a battery of the case and a battery of the wireless device.

The one or more processors may further reserve power for the case by deactivating the capacitive sensing circuitry, the transceivers, the Hall-Effect sensor, the input/output/sensing line, and/or the electrical component. To deactivate the input/output/sensing line and electrical component, the one or more processors may generate a high impedance signal (high-Z logic state of a tristate logic gate) at the input/output/sensing line, which is in turn passed through the electrical component. This high-impedance signal effectively removes the influence of the input/output/sensing line and the electrical component from the rest of the circuitry and thereby reduces energy loss and corrosion on the input/output/sensing line and the electrical component.

The technology is advantageous because it provides a case for smart and efficient charging of wireless devices. Using capacitive sensing, the case can detect the wireless devices inside even if they are completely discharged or powered off. The case also provides for two way communication between the case and the wireless devices inside to better manage efficient charging. Further, energy may be conserved by adjusting the sampling rate of capacitive sensing and the communication rate of the transceiver, as well as by selectively turning on and off capacitive sensing and communication. Energy may be further conserved by controlling an extent to charge the wireless devices. Still further, the case uses high impedance signals to deactivate unnecessary signal/power lines to further reduce energy loss and corrosion.

Example Systems

FIG. 1 shows a simplified circuit diagram of an example system including an example case 100 and a wireless device 180. Although only one wireless device 180 is shown in this example, the case 100 may be configured to charge multiple wireless devices. The case 100 includes an electrical component 110 such that, when the wireless device 180 is positioned inside the case 100, the electrical component 110 operatively connects circuitry of the case 100 to circuitry of the wireless device 180. Although the electrical component 110 is shown as a single wire, the electrical component 110 may include one or more wires, one or more electrical contacts, or a bus with multiple pins.

Figure 2:
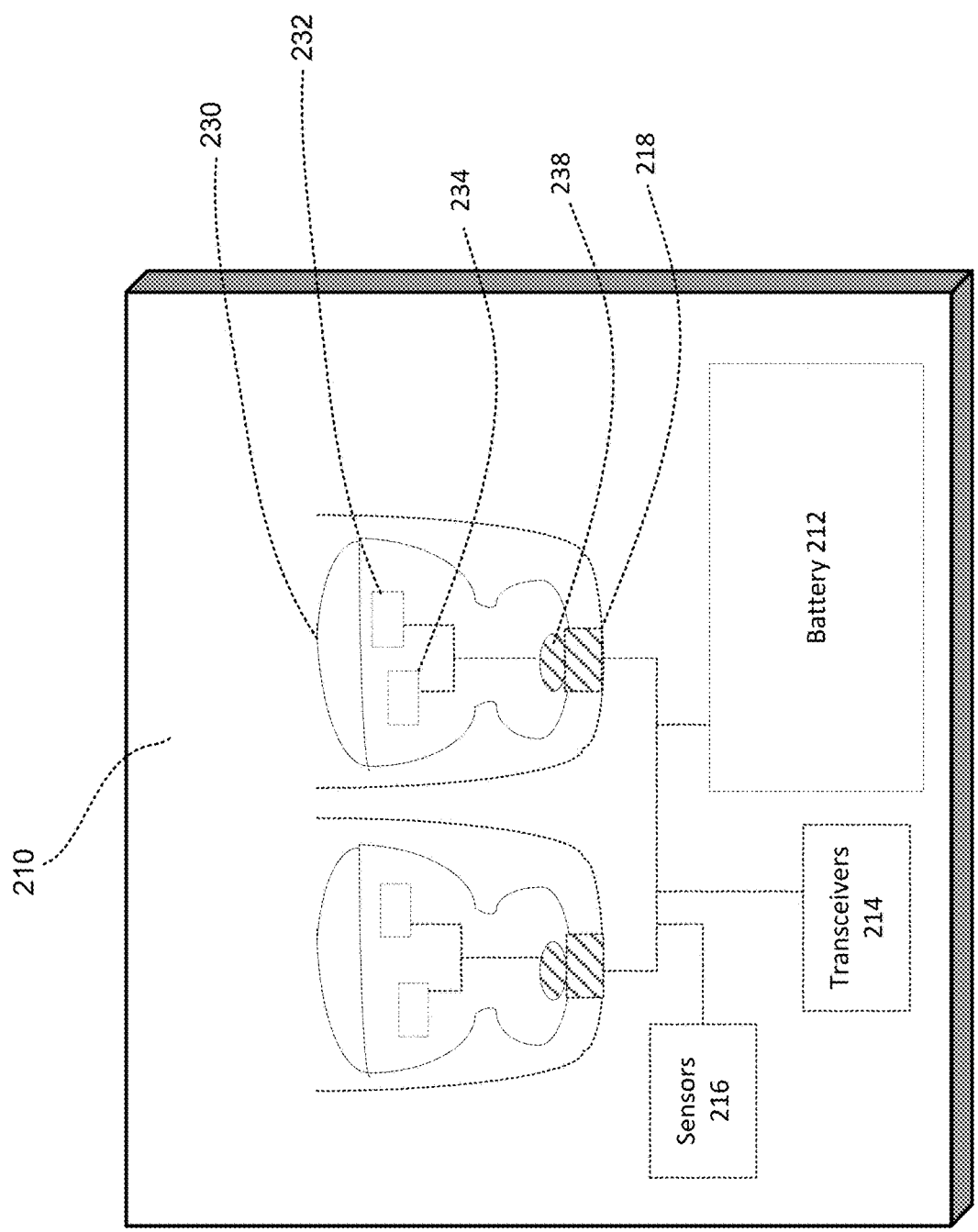
FIG. 2 is a pictorial diagram illustrating example physical structures of the system of FIG. 1.

For example, FIG. 2 provides a pictorial diagram illustrating an example physical structure of the case 100 and wireless device 180 of FIG. 1. As shown in this example, the case 210 houses a pair of wireless earbuds 230. The earbuds 230 may be wireless in that they do not require a wired connection to a music player, phone, or other device to be powered. The earbuds 230 include one or more batteries 232 which provide power to the earbuds 230 and other components therein, such as transceivers 234, sensors, amplifiers, etc. The batteries 232 of the earbuds 230 may be relatively small, in view of the small size of the earbuds 230. The case 210 in which the earbuds 230 are shipped and stored may have a larger battery 212. This larger battery 212 of the case 210 may deliver a charge to the smaller batteries 232 of the earbuds 230. Data can be transmitted between the transceivers 234 of the earbuds 230 and the transceiver 214 of the case 210. Sensors 216 of the case 210 can be configured to detect a variety of conditions, such as whether the earbuds 230 are inside the case 210, and whether the case 210 is open or closed.

When the earbuds 230 are placed inside the case 210 in a given orientation, contacts 238 on the earbuds 230 may come into contact with contacts 218 on the case 210 to establish electrical connections. For example, contacts 238 and 218 may be part of the electrical component 110 shown in FIG. 1. The electrical connections may include a power line connection between the charger of battery 212 of the case 210 and the output booster of battery 232 of the earbuds 230, a communication connection between the transceiver 214 of the case 210 and the transceivers 234 of the earbuds 230, a sensing connection between the sensors 216 of the case 210 and the earbuds 230, and a ground line connection. In some examples, each earbud may operate independently, and thus separate electrical connections are established with the two earbuds.

While the example of FIG. 2 illustrates the wireless device as an earbud, it should be understood that the wireless device may alternatively be any of a number of wireless devices, such as a phone, phone accessories, smartwatch, toys, gaming systems, tablets, etc. While the example of FIG. 2 illustrates the case as a container that encloses the earbuds, it should be understood that the case may alternatively be any of a number of shapes, such as a holder, a protective cover, etc.

Referring back to FIG. 1, the case 100 includes capacitive sensing circuitry 120 for detecting whether the wireless device 180 is positioned inside the case 100 based on a capacitance of the wireless device 180. The capacitive sensing circuitry 120 sends and receives signals through a sensing line 130 connected to the electrical component 110. In this regard, the capacitive sensing circuitry 120 may send sensing pulses through the sensing line 130 to the electrical component 110. When there is no wireless device 180 positioned inside the case 100, the capacitive sensing circuitry 120 may detect a capacitance from the circuitry of the case 100 itself (for example, from transceiver 150 of the case 100). In contrast, when the wireless device 180 is positioned inside the case 100 such that the electrical component 110 operatively connects the wireless device 180 to the capacitive sensing circuitry 120, the capacitive sensing circuitry 120 may detect an additional capacitance from the wireless device 180. Because this additional capacitance results from the mere existence of the circuitry inside the wireless device 180, the presence of the wireless device 180 may be detected even if the wireless device 180 is completely out of charge or powered off. For example, the capacitive sensing circuitry 120 may be configured to detect a change in capacitance as small as a fraction of a picofarads (pFs).

As shown, a strong pull-up resistor 132 may be implemented on the sensing line 130 to provide driving signal of logic 1 during communication between transceivers 150 and 190, and protection from electrostatic discharge (ESD) to capacitive sensing circuitry 120. This way, electrostatic charges may be dissipated by the strong pull-up resistor 132, instead of passed through the sensing line 130 to interfere with the capacitive sensing signals. For example, the strong pull-up resistor 132 may have a value between 100Ω and 10 kΩ. A weak pull-down resistor 134 and 198 may be implemented to connect the electrical component 110 to a ground, thereby setting logic level 0 at transceiver 150 and transceiver 190 inputs, when strong pull-up resistor 132 is not activated, or wireless device 180 is not attached. This way, noise signals on the sensing line 130 are routed to the ground, instead of passed through the sensing line 130 to the capacitive sensing circuitry 120 or one or more processors 140. For example, the weak pull-down resistor 134 may have a value between 100 KΩ and 10 MΩ.

The one or more processors 140 are configured to control the capacitive sensing circuitry 120. In this regard, the one or more processors 140 may be provided with a connection 142 to the capacitive sensing circuitry 120. The one or more processors 140 may generate a control signal and send the control signal through the connection 142 to the capacitive sensing circuitry 120. The control signal may be an enabling signal that enables the capacitive sensing circuitry 120 to send sensing pulses through the sensing line 130, and also to receive a capacitance detection through the sensing line 130. The control signal may drive capacitive sensing circuitry 120 to output a high level, which enables the pull-up resistor 132 during communication between transceiver 150- and 190. The control signal may also be a disabling signal that disables the capacitive sensing circuitry 120. The one or more processors 140 may also receive detection data from the capacitive sensing circuitry 120 through the connection 142, or alternatively through a separate connection.

The one or more processors 140 may further generate control signals that control a sampling rate of the sensing pulses sent by the capacitive sensing circuitry 120. For example, the one or more processors 140 may determine an appropriate sampling rate based on a state of the case 100. For example, the one or more processors 140 may set the sampling rate of the capacitive sensing circuitry 120 to a predetermined low sampling rate, such as between approximately 1 Hz-10 Hz, when the case 100 is in a standby state. As another example, the one or more processors 140 may set the sampling rate of the capacitive sensing circuitry 120 to a predetermined high sampling rate, such as up to approximately 10 Hz to 100 Hz, when the case 100 is in an active state. It should be understood that the example sampling rates set forth herein are merely non-limiting examples, and that other high or low sampling rates may be predetermined. While a lower sampling rate may conserve energy of the case 100, higher sampling rate may reduce the detection latency of the case 100. In this regard, an active state may be a state in which the case 100 is actively performing one or more functions, such as broadcasting music or displaying information to a user; and a standby state may be a state in which the case 100 is not actively performing any function.

The one or more processors 140 may further determine the appropriate sampling rate based on detections from other sensors. For example, as shown in FIG. 1, the case 100 additionally includes a proximity sensor 160 for detecting whether the case 100 is open or closed, for example, a Hall Effect sensor. The one or more processors 140 are configured to control the proximity sensor 160. In this regard, the one or more processors 140 may be provided with a connection 144 to the capacitive sensing circuitry 120. The one or more processors 140 may generate a control signal and send the control signal through the connection 144 to the proximity sensor 160. The control signal may be an enabling signal that enables the proximity sensor 160 or a disabling signal that disables the proximity sensor 160. The one or more processors 140 may also receive detection data from the proximity sensor 160 through the connection 144.

The one or more processors 140 may determine the appropriate sampling rate based on detections from the proximity sensor 160. For example, if the case 100 is detected as closed, it may be assumed that no wireless device can be placed into or taken out of the case 100, therefore the one or more processors 140 may deactivate the capacitive sensing circuitry 120 to conserve energy. Conversely, if the case 100 is detected as open, it may be likely that the wireless device will be placed inside or taken out of the case 100 at some point, therefore the one or more processors 140 may activate the capacitive sensing circuitry 120 to actively monitor the presence of the wireless device. In another example, instead of activating/deactivating the capacitive sensing circuitry 120, the one or more processors 140 may set the sampling rate of the capacitive sensing circuitry 120 based on whether the case 100 is open or closed. For example, the one or more processors 140 may set the sampling rate of the capacitive sensing circuitry 120 to a predetermined low sampling rate when the case 100 is detected to be closed, and set the sampling rate of the capacitive sensing circuitry 120 to a predetermined high sampling rate when the case 100 is detected to be open.

The one or more processors 140 may further determine the appropriate sampling rate based on a presence of the wireless device 180. As described above, the one or more processors 140 may receive detection data from the capacitive sensing circuitry 120 through the connection 142. For instance, once the wireless device 180 is detected to be inside the case 100, it may be assumed that the wireless device 180 was inserted in the case 100 for charging or storage for at least some period of time, thus the one or more processors 140 may set the sampling rate of the capacitive sensing circuitry 120 to a predetermined low sampling rate. Conversely, if the wireless device 180 had not been detected to be inside the case 100 yet, the capacitive sensing circuitry 120 may take on a more active role to detect insertion of the wireless device 180 as soon as possible so that charging or communication can begin soon after the wireless device 180 is inserted into the case 100, thus, the one or more processors 140 may set the sampling rate of the capacitive sensing circuitry 120 to a predetermined high sampling rate.

The case 100 also includes a transceiver 150 for transmitting data to and receiving data from the wireless device 180. To enable communication with the case 100, the wireless device 180 also includes a transceiver 190 for transmitting data to and receiving data from the case 100. The transceiver 190 of the wireless device 180 may be the same as or different from the transceiver 150 of the case 100. In some examples, the wireless device 180 may further include a capacitive sensing circuitry for detecting whether it is being placed inside the case 100. For instance, the wireless device 180 may initiate communication with the case 100 upon detecting that it has been placed inside the case 100.

Figure 3:
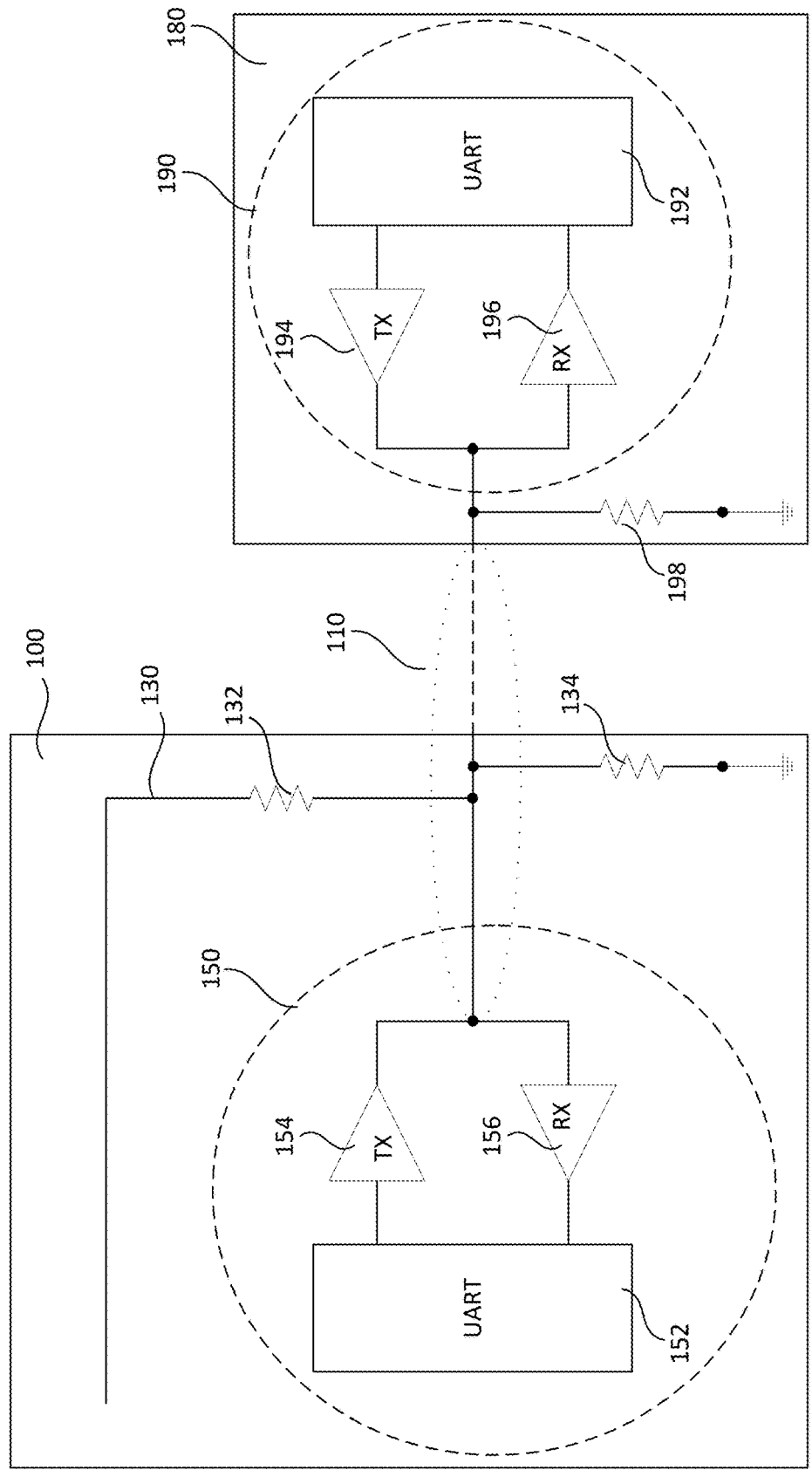
FIG. 3 is a circuit diagram illustrating an example implementation of the system of FIG. 1

FIG. 3 is a simplified circuit diagram showing an example implementation of the transceiver 150 of case 100 and the transceiver 190 of the wireless device 180. As shown, the transceiver 150 may include a universal asynchronous receiver-transmitter 152 ("UART") for controlling the transmission of data in a sequential fashion. The transceiver 150 may be implemented for half duplex communication. In this regard, the transmitter 154 is connected to the receiver 156, this way, the transceiver 150 is either transmitting data to or receiving data from the wireless device 180 through the electrical component 110, but not both at the same time. As shown, in this example the transceiver 190 of the wireless device 180 is implemented in the same way as the transceiver 150 of the case 100, including a UART 192 for controlling transmission of data in a sequential fashion and its configuration for half duplex communication (the transmitter 194 is connected to the receiver 196).

Referring back to FIG. 1, the one or more processors 140 are configured to control the transceiver 150 of the case 100. In this regard, the one or more processors 140 may be provided with an input/output line 146 connected to electrical component 110. As shown, the input/output line 146 in this example partially overlaps with the sensing line 130 (the portion between the capacitive sensing circuitry 120 and the electrical component 110). The one or more processors 140 may generate a control signal through the input/output line 146 to the electrical component 110, which is in turn connected to the transceiver 150. The control signal may be a logic 1 signal that enables communication between the transceiver 150 of the case 100 and the transceiver 190 of the wireless device 180 through the electrical component 110. Alternatively, the control signal may be a high impedance signal (such as a high-Z logic state of a tristate logic gate) that disables communication between the transceiver 150 of the case 100 and the transceiver 190 of the wireless device 180. The one or more processors 140 may be provided with a connection 147 to send data to and receive data from the transceiver 150.

When the input/output line 146 partially overlaps the sensing line 130 for capacitive sensing, as shown in this example, the strong pull-up resistor 132 and weak pull-down resistor 134 can also serve to provide logic values for communication between the case 100 and the wireless device 180. The strong pull-up resistor 132 provides a logic 1 during active communication, while the weak pull-down resistor 134 provides a logic 0 when the strong pull-up resistor 132 is not engaged, so that the input to either transceiver 150 and 190 have a known logic level 0. In this regard, resistance values for the strong pull-up resistor 132 and weak pull-down resistor 134 and 198 may be selected such that when strong pull-up resistor 132 is engaged, the input of transceiver 150 and 190 have a known logic level 1, and strong pull-up resistor 132 provides sufficient ESD protection to capacitive sensing circuitry 120. The strong pull-up resistor 132 and weak pull-down resistors 134, 198 may be selected to have different resistance values. For example, the strong pull-up resistor 132 may be selected to be much stronger (lower resistance) than the weak pull-down resistors 134, 198 (higher resistance). For example, the strong pull-up resistor 132 may have a value between 100Ω and 10 kΩ, and the weak pull-down resistors 134 and 198 may have a value between 100 k kΩ and 10 MΩ.

Figure 4:
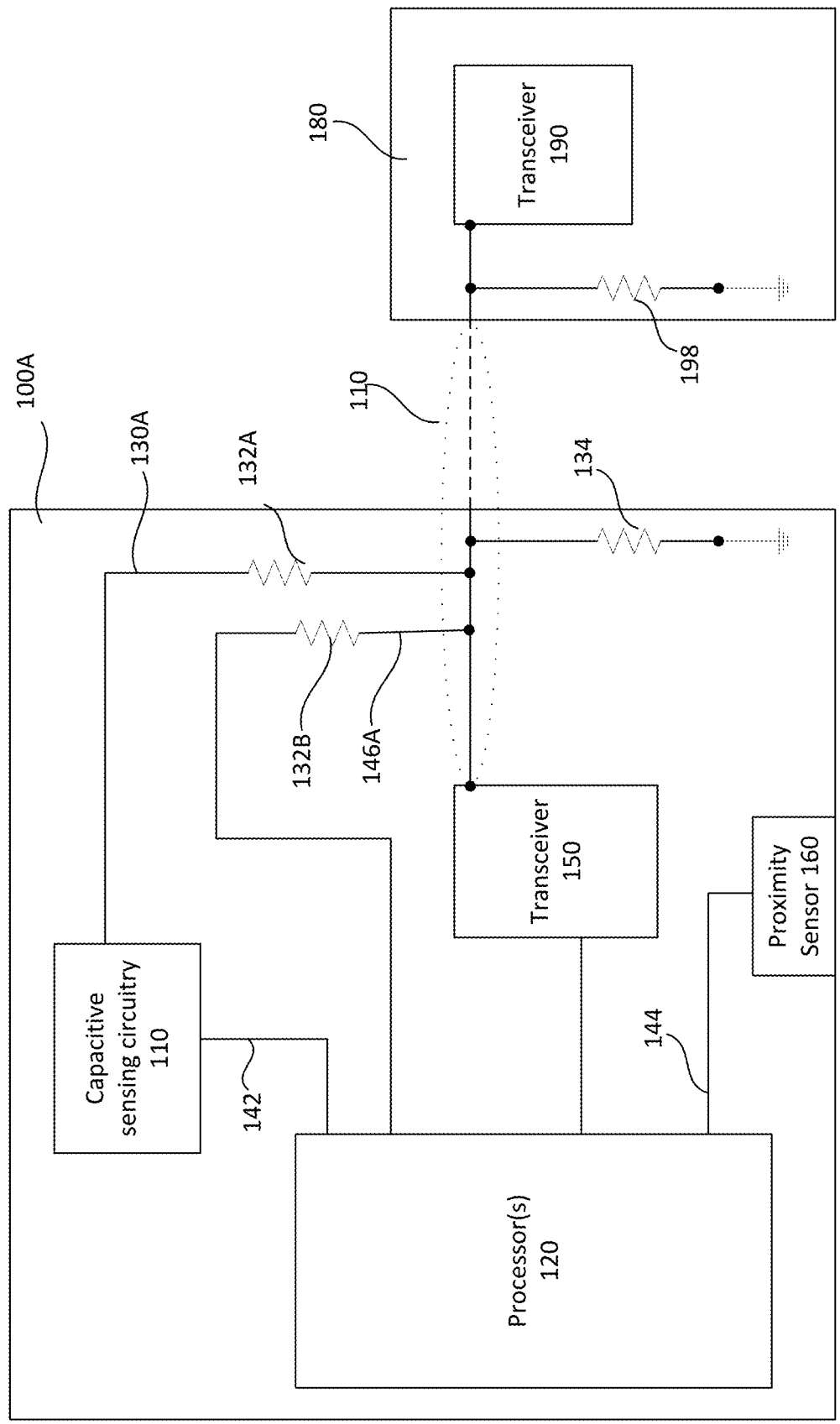
FIG. 4 illustrates another example system in accordance with aspects of the disclosure.

Although in this example, the input/output line 146 partially overlaps the sensing line 130, in other examples, the input/output line 146 and the sensing line 130 may be implemented as completely separate lines. For example, FIG. 4 is a simplified circuit diagram of another example case 100A. Example case 100A includes many of the features of example case 100, but with differences as discussed further below. Specifically, case 100A includes a sensing line 130A connecting the capacitive sensing circuitry 120 to the electrical component 110. A first strong pull-up resistor 132A may be provided to protect the capacitive sensing circuitry 120 from ESD. Separately, case 100A also has an input/output line 146A connecting the one or more processors 140 to the electrical component 110. A second strong pull-up resistor 132B may be provided for generating a logic 1 signal for the transceiver 150. The first and second strong pull-up resistors 132A and 132B may have same or different resistance values, for example, the first strong pull-up resistor 132A may have a resistance between 100Ω and 10 kΩ, and the second strong pull-up resistor 132B may have a resistance between 100Ω and 10 kΩ. On the one hand, sharing wires for multiple purposes as shown in FIG. 1 may be more energy efficient, on the other hand, using separate wires for different purposes as shown here in FIG. 4 may increase reliability.

An example communication sequence is described here with reference to FIG. 3. As the strong pull-up resistor 132 mentioned above, the one or more processors 140 may generate a logic 1 signal to enable transceiver 150 for communication, when this logic 1 signal is first turned on via strong pull-up resistor 132, it may act as an interrupt signal to wake up the wireless device 180, prompting the wireless device 180 to respond. When the transceiver 190 of the wireless device 180 responds by transmitting data to the case 100, the transmitter 194 of the wireless device 180 can either generate a logic 0 signal by driving electrical component 110 to logic 0, or releasing the drive, allowing the strong pull-up resistor 132 in the case 100 to maintain the logic 1 signal. For example, the transmitter 194 of the wireless device 180 may have an open collector driver (not shown) that can be turned on, which connects electrical component 110 to the ground, this logic 0 signal is then transmitted through the electrical component 110 to the receiver 156 of the case. Conversely, when the transmitter 194 of the wireless device releases the open collector driver, this allows the logic 1 signal from the strong pull-up resistor 132 to be supplied to the receiver 156 of the case 100.

Similarly, the transceiver 150 of the case 100 may transmit data to the transceiver 190 of the wireless device 180. In this regard, the transmitter 154 of the case 100 can similarly generate a logic 0 signal by driving electrical component 110 low, or allow the strong pull-up resistor 132 to maintain the logic 1 signal when transmitter 154 is not driven. For example, the transmitter 154 of the case 100 may also have an open collector driver (not shown) that can connect to the electrical component 110, which connects to the ground when driven, this logic 0 signal is then transmitted through the electrical component 110 to the receiver 196 of the wireless device 180. Conversely, when the transmitter 154 of the case 100 releases the open collector driver, this allows the logic 1 signal from strong pull-up resistor 132 to be supplied to the receiver 196 of the wireless device 180.

The case 100 and the wireless device 180 may transmit data to each other in a sequential fashion. For example, the case 100 and the wireless device 180 may take turns transmitting data for fixed periods of time (such as 10 ms of communication in each direction). As another example, the case 100 and/or the wireless device 180 may be configured to indicate when it has no more data to transmit and is ready to receive data, and such an indication may cause communication to reverse in direction. The one or more processors 140 may control the sequence of communication.

The data transmitted between the case 100 and the wireless device 180 may include battery life information. For example, the case 100 and the wireless device 180 may send each other their own battery charge status. As another example, the case 100 may send the wireless device 180 a request ("ping") for the wireless device's 180 charge status. In some examples, the case 100 may make these requests at regular time intervals. In other examples, the case 100 may request an update on the wireless device's 180 charge status while charging is ongoing. A failure to respond to communication by either the case 100 or the wireless device 180 may indicate that it is completely discharged.

The case 100 and wireless device 180 may also relay information to each other. For instance, a user may want to know the charge status of the wireless device 180 while it is being charged in the case 100. In this regard, the case 100 may send a request to the wireless device 180 for its charge status, receive the charge status from the wireless device, and then display that information to the user or send that information to another user device. In another instance, the user may want the wireless device 180 to perform a task (e.g., broadcast music) while charging inside the case 100, in this regard, the case 100 may receive the user request and relay this request to the wireless device 180.

The one or more processors 140 may control direction and frequency of communication by the transceiver 150. In this regard, the one or more processors 140 may analyze various detected and received data to determine an appropriate direction and frequency of communication. In some example, the one or more processors 140 may determine the appropriate direction and frequency of communication based on data received by the transceiver 150. For example, if the transceiver 150 had previously received data from the wireless device 180 indicating that it had a low charge status, the one or more processors 140 may generate a control signal to the transceiver 150 to ping the wireless device 180 for its charge status at a predetermined high communication rate. Conversely, if the transceiver 150 had previously received data from the wireless device 180 indicating that it had a full charge status, the one or more processors 140 may generate a control signal to the transceiver 150 to ping the wireless device 180 for its charge status at a predetermined low communication rate. For example, the predetermined high communication rate may be up to 100 Hz. For example, the predetermined low communication rate may be 1 Hz to 10 Hz. It should be understand that the example communication rates set forth herein are merely non-limiting examples, and that other high or low sampling rates may be predetermined.

As another example, if the transceiver 150 received data from the wireless device 180 indicating that it is or had been in working mode, the one or more processors 140 may generate a control signal to the transceiver 150 to ping the wireless device 180 for its charge status at a predetermined high communication rate. Conversely, if the transceiver 150 had received data from the wireless device 180 indicating that it is or had been in factory mode, the one or more processors 140 may generate a control signal to the transceiver 150 to ping the wireless device 180 for its charge status at a predetermined low communication rate, or in the situation when earbuds are inside a close case, completely halt the communication until the case is open again. In this regard, a working mode may be a mode in which the wireless device 180 is actively performing one or more functions, such as broadcasting music or displaying information to a user; and a factory mode may be a state in which the wireless device 180 is not actively performing any function. As yet another example, if the transceiver 150 receives no response from the wireless device 180, it may be assumed that the wireless device 180 is completely discharged, the one or more processors 140 may then generate a control signal to the transceiver 150 to ping the wireless device 180 after charging for a fixed period of time.

In other examples, the one or more processors 140 may determine the appropriate direction and frequency of communication based on detection data from the capacitive sensing circuitry 120. For example, upon receiving detection data that the wireless device 180 has been positioned into the case 100, the one or more processors 140 may generate a control signal to enable the transceiver 150 for initiating communication with the wireless device 180. As another example, upon receiving detection data that the wireless device 180 is removed from the case 100, the one or more processors 140 may generate a control signal to disable the transceiver 150. As yet another example, upon analyzing detection data that the wireless device 180 had been positioned in the case 100 for a predetermined period of time (such as 7 days), the one or more processors 140 may generate a control signal to the transceiver 150 to regularly ping the wireless device 180 for its charge status (to monitor discharging of the wireless device 180). In this regard, the one or more processors 140 may be provided with a clock (not shown) for keeping time.

In still other examples, the one or more processors 140 may determine the appropriate direction and frequency of communication based on detection data from the proximity sensor 160. For example, upon receiving detection data that the case 100 is closed, the one or more processors 140 may generate a control signal to the transceiver 150 to ping the wireless device 180 for its charge status at a predetermined low communication rate. As another example, upon receiving detection data that the case 100 is open, the one or more processors 140 may generate a control signal to the transceiver 150 to ping the wireless device 180 for its charge status at a predetermined high communication rate. This way, when the case 100 is open, which means that at any moment the wireless device 180 may be inserted into the case 100, the communication rate is higher to reduce detection latency and quickly detect whether the wireless device 180 needs charging. On the other hand, the wireless device 180 cannot be inserted or removed from the case 100 while the case 100 is closed, therefore the communication rate can be set lower.

The one or more processors 140 may control charging of the wireless device 180. In this regard, a connection may be provided between a battery (not shown) of the case 100 and a battery (not shown) of the wireless device 180 when the wireless device 180 is positioned inside the case 100. For example, the connection may be provided by the electrical component 110 or some other component, such as wires, contacts or one or more pins on a bus. The one or more processors 140 may be provided with one or more connections to the battery of the case 100 so that the one or more processors 140 can be powered by the battery, monitor a charge status of the battery, and control charging of the wireless device 180 by the battery.

In this regard, the one or more processors 140 may analyze various detected and received data to determine whether to charge the wireless device 180 and an appropriate extent to charge the wireless device 180. In some examples, the one or more processors 140 may determine whether to charge the wireless device 180 and an appropriate extent to charge the wireless device 180 based on data received by the transceiver 150. For example, the one or more processors 140 may be configured to enable charging of the wireless device 180 whenever the battery charge status indicates that it is not fully charged. As another example, the one or more processors 140 may be configured to enable charging of the wireless device 180 only when it is not sufficiently charged to a predetermined sufficient charge threshold (such as below 80%, below 70%, etc.). As yet another example, if the wireless device 180 cannot send its charge status (e.g. completely discharged), the one or more processors 140 enable charging of the wireless device 180 until the wireless device 180 is able to turn on and send its charge status. As still another example, the one or more processors 140 may be configured to enable charging of the wireless device 180 when data received from the transceiver 150 indicates that the wireless device 180 is or had been in working mode, and disable charging of the wireless device 180 when data received from the transceiver 150 indicates that the wireless device 180 is or had been in factory mode.

In other examples, the one or more processors 140 may determine whether to charge the wireless device 180 and an appropriate extent to charge the wireless device 180 based on detection data from the capacitive sensing circuitry 120. For example, upon receiving detection data that the wireless device 180 has been positioned into the case 100, the one or more processors 140 may generate a control signal to initiate charging. As another example, upon analyzing detection data that the wireless device 180 had been positioned in the case 100 for a predetermined period of time (such as 7 days), the one or more processors 140 may assume that the wireless device would be completely discharged and generate a control signal to initiate charging.

Although the case 100 may handle a completely charged wireless device 180 without problem—capacitive sensing circuitry 120 is able to detect completely discharged wireless device 180, and the completely discharged wireless device 180 may be charged until it is able to respond to communication with the transceiver 150—not much can be done if the case 100 itself is completely discharged. Thus, to prevent this situation, the one or more processors 140 may be configured to control charging of the wireless device 180 such that power is reserved for the case 100 when it has a charge status below a predetermined critically low charge threshold, such as below 10% charged, 5% charged, etc. For example, this may be done by only allowing the critically-low-charged case 100 to charge the wireless device 180 up to a predetermined minimal charge threshold. For instance, the predetermined minimal charge threshold may be a charge required to turn on the wireless device 180, or the charge required for the wireless device 180 to report its charge status.

In addition to controlling the capacitive sensing circuitry 120 (enable/disable/sampling rate), the transceiver 150 (enable/disable/communication rate), and charging (enable/disable/extent) as discussed above, the one or more processors 140 may be configured to further conserve power for the case 100 by deactivating the sensing line 130, input/output line 146, and/or the electrical component 110. To deactivate the sensing line 130, the input/output line 146, and/or the electrical component 110, the one or more processors 140 may generate a high impedance signal (high-Z logic state of a tristate logic gate) to the input/output line 146, which in turn also passes through the sensing line 130 as well as the electrical component 110. This high-impedance signal effectively removes the influence of the input/output line 146, the sensing line 130, and the electrical component 110 from the rest of the circuitry of the case 100, thereby reducing energy loss on these lines. In particular, where the electrical component 110 has exposed portions, such as a contact for interfacing with a contact of the wireless device 180, the high-impedance signal also reduces corrosion at such exposed portions. In the example of FIG. 4, where the sensing line 130A and the input/output line 146A are separate, the one or more processors 140 may generate a high impedance signal to the input/output line 146A to disable the electrical component 110. In examples where the electrical component 110 includes multiple wires, contacts, or a bus with multiple pins, the one or more processors 140 may generate a high impedance signal to all or only some of the wires/contacts/pins.

In this regard, the one or more processors 140 may be configured to generate the high-impedance signal whenever capacitive sensing, communication, and charging are not needed/wanted. For example, the one or more processors 140 may generate the high-impedance signal when the wireless device 180 is detected to be inside the case 100 with full charge and in factory mode, and the case 100 is closed. As another example, the high-impedance signal may be used if no wireless device 180 had been detected inside the case 100 and the case 100 is closed. As yet another instance, the one or more processors 140 may generate the high-impedance signal when the case 100 has a charge status below the predetermined critically low charge threshold to prevent the case 100 from becoming completely discharged.

Figure 5:
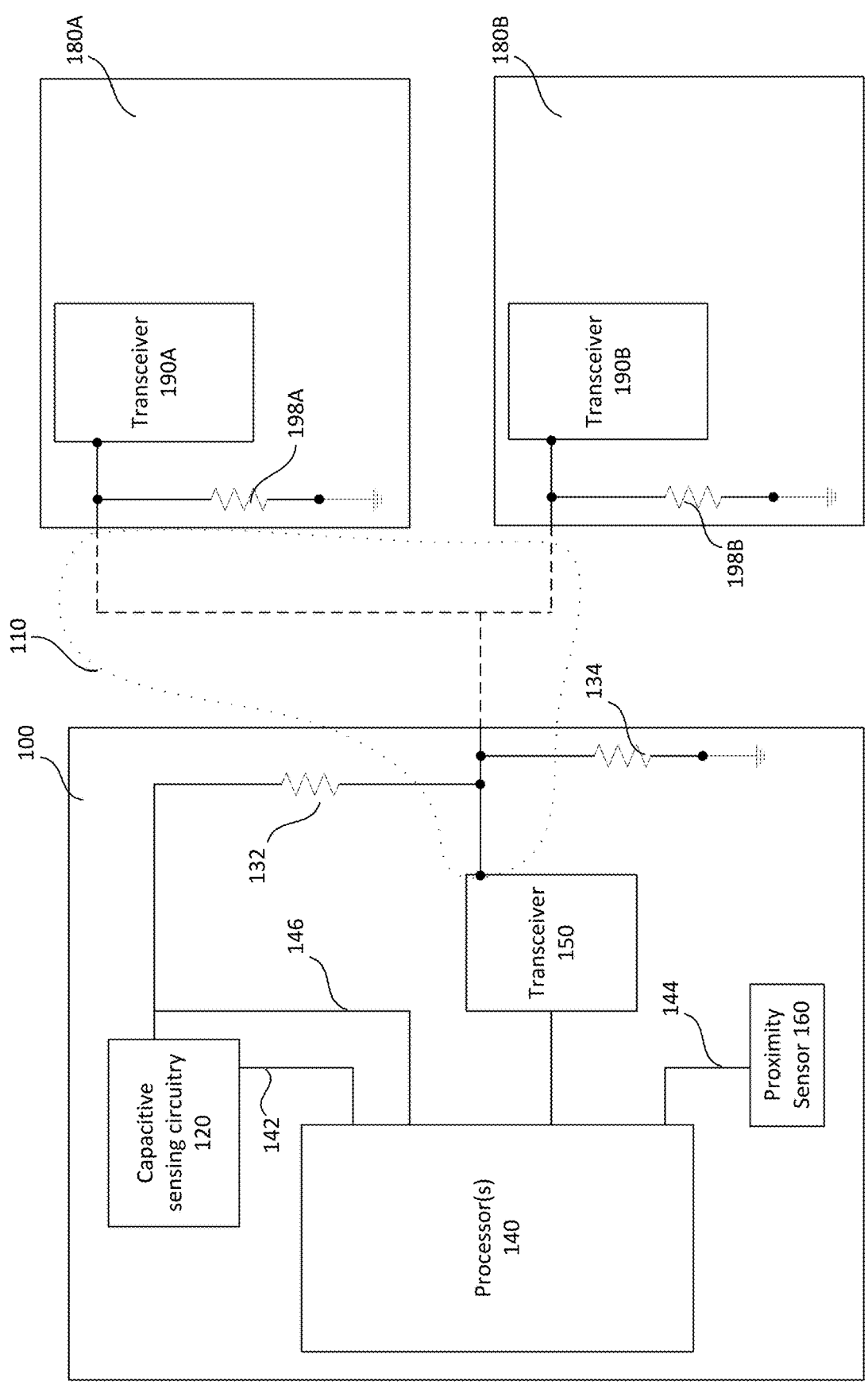
FIG. 5 illustrates another example system in accordance with aspects of the disclosure.

Although circuit diagrams in FIGS. 1, 3 and 4 show only one wireless device 180, the case 100 may be configured for charging multiple wireless devices, such as a pair of wireless earbuds. For example, FIG. 5 is a simplified circuit diagram of the example case 100 with two wireless devices 180A and 180B. The two wireless devices 180A and 180B may have the same or different circuitry. The two wireless devices 180A and 180B are each provided with a connection to the electrical component 110. For example, where the electrical component 110 is a single wire, the two wireless devices 180A and 180B may each have an electrical contact that makes contact with the single wire. As another example, where the electrical component 110 includes two wires with contacts, the two wireless devices 180A and 180B may each have an electrical contact that interfaces with one of the two contacts of the electrical component 110. As yet another example, where the electrical component 110 is a bus with multiple pins, the two wireless devices 180A and 180B may each have an electrical contact that interfaces with a pin on the bus. While using a single wire as the electrical component 110 may be more energy efficient and reduces corrosion, using multiple wires or a dedicated bus as the electrical component 110 may increase reliability.

Figure 6:
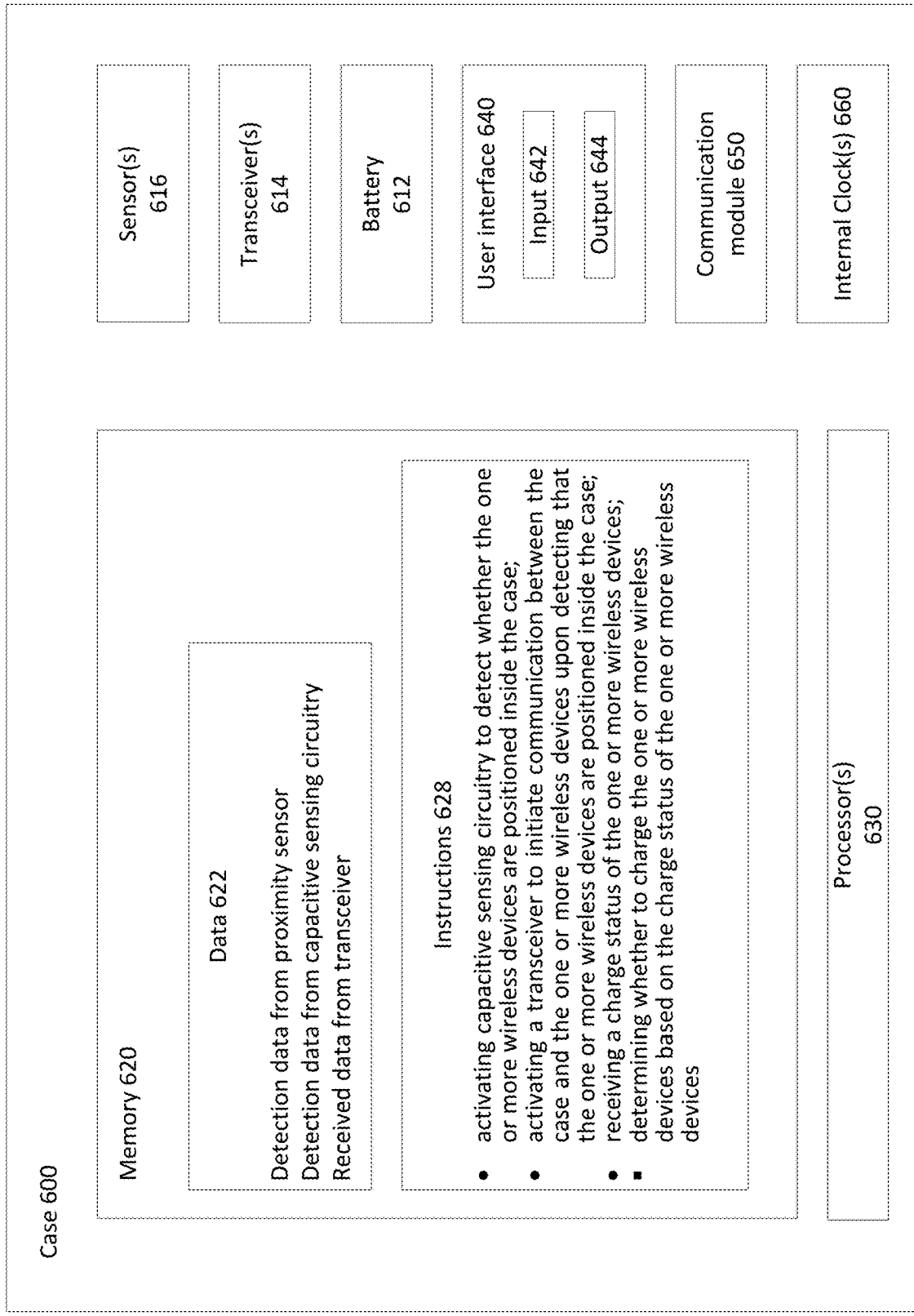
FIG. 6 is a block diagram of an example system in accordance with aspects of the disclosure.

FIG. 6 shows an example case 600 for charging one or more wireless devices. The case 600 may include one or more processors 630, one or more memories 620, as well as other components. For example, the case 600 may further include a battery 612, one or more transceivers 614, and one or more sensors 616. The case 600 may further include a user interface 640, a communication module 650, and one or more internal clocks 660. The case 600 may include some or all of the features of the case 100 in FIGS. 1, 3 and 5, or some or all of the features of the case 100A in FIG. 4. For example, the one or more processors 630 may include the one or more processors 140 in FIG. 1 or 3-5. The case 600 may have physical structures of case 210 shown in FIG. 2. For example, the battery 612 may be implemented as the battery 212 of FIG. 2, the one or more transceivers 614 may include the transceiver 214, and the one or more sensors 616 may include the sensors 216 of FIG. 2.

The memory 620 may store information accessible by the one or more processors 630, including data 622 instructions 628 that may be executed or otherwise used by the one or more processors 630. For example, memory 620 may be of any type capable of storing information accessible by the processor(s) 630, including a computing device-readable medium, or other medium that stores data that may be read with the aid of an electronic device, such as a volatile memory, non-volatile as well as other write-capable and read-only memories. By way of example only, memory 620 may be a static random-access memory (SRAM) configured to provide fast lookups. Systems and methods may include different combinations of the foregoing, whereby different portions of the instructions and data are stored on different types of media.

The data 622 may be retrieved, stored or modified by the one or more processors 630 in accordance with the instructions 628. For instance, data 622 may include detection data from the sensors 616, which may indicate whether the case 600 is open or closed, or whether a wireless device is detected inside the case 600. The data 622 may also include data received through the one or more transceivers 614, such as battery life information of the wireless device positioned inside the case 600. In accordance with the instructions 628, the one or more processors 630 may control the sensors 616, the transceivers 614, and/or the battery 612 based on the data 622. Although the claimed subject matter is not limited by any particular data structure, the data may be stored in computing device registers, in a relational database as a table having a plurality of different fields and records, XML documents or flat files. The data may also be formatted in any computing device-readable format.

The instructions 628 may be any set of instructions to be executed directly (such as machine code) or indirectly (such as scripts) by the one or more processors 630. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 630 may be microprocessors, logic circuitry (e.g., logic gates, flip-flops, etc.) hard-wired into the case 600, or may be a dedicated application specific integrated circuit (ASIC). It should be understood that the one or more processors 630 are not limited to hard-wired logic circuitry, but may also include any commercially available processing unit, or any hardware-based processors, such as a field programmable gate array (FPGA). In some examples, the one or more processors 630 may include a state machine.

The one or more sensors 616 may include any of a variety of mechanical or electromechanical sensors, such as the capacitive sensing circuitry 120, the proximity sensor 160, or an accelerometer, gyroscope, magnetic sensor, switch, light sensor, barometer, audio sensor (e.g., microphone), vibration sensor, heat sensor, radio frequency (RF) sensor, etc. In this regard, the one or more processors 630 and memory 620 of the case 600 may receive detection data from any of these sensors 616.

The user interface 640 includes various I/O elements. For instance, one or more user inputs 642 such as mechanical actuators, soft actuators, and microphone may be provided. The mechanical actuators may include a crown, buttons, switches and other components. The soft actuators may be incorporated into a touchscreen cover, e.g., a resistive or capacitive touch screen. The user interface 640 includes various outputs 644, for example, a user display such as a screen or a touch screen, one or more speakers, transducers or other audio outputs, or a haptic interface or other tactile feedback to provide non-visual and non-audible information.

The communication module 650 may include a wireless network connection module, a wireless ad hoc connection module, and/or a wired connection module. The wireless network connection module may be configured to support communication via cellular, LTE, 4G, WiFi, GPS, and other networked architectures. The wireless ad hoc connection module may be configured to support Bluetooth®, Bluetooth LE, near field communications, and other non-networked wireless arrangements. And the wired connection may include a USB, micro USB, USB type C or other connector, for example to receive data and/or power from a laptop, tablet, smartphone or other device.

The one or more internal clocks 660 provide timing information, which can be used for time measurement in various operations run by the one or more processors 630, the one or more transceivers 614, the one or more sensors 616, and/or the communication module 650. For example, using the one or more internal clocks 660, the one or more processors 630 may determine that a wireless device had been positioned in it for a predetermined period of time (such as 7 days), thus the wireless device is likely completely discharged.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 7:
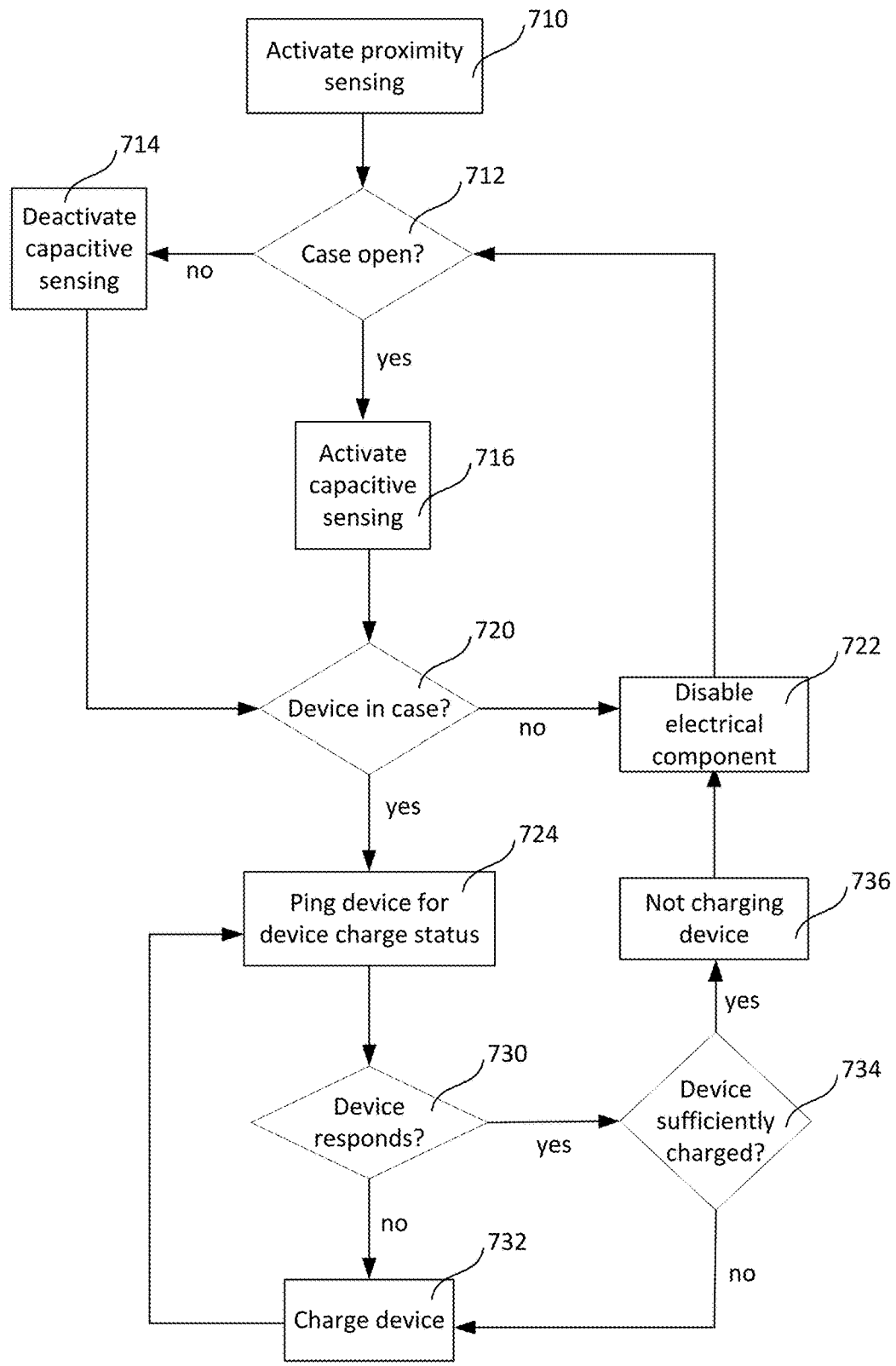
FIG. 7 is an example flow diagram illustrating an example method in accordance with aspects of the disclosure.

FIG. 7 provides an example flow diagram illustrating an example method 700 for controlling sensing, communication with, and charging of a wireless device in a case. For example, the one or more processors 140 of case 100 or 100A shown in FIGS. 1 and 3-5 may be used to control sensing and charging of the wireless device 180 according to the method 700. For example, the case 100 or 100A may control sensing, communication with, and charging of the wireless device 180 based on detections from capacitive sensing circuitry 120 and proximity sensor 160, and data received from transceiver 150.

In block 710, proximity sensing is activated. For example, the one or more processors 140 may generate a control signal to activate the proximity sensor 160. In other examples, where low power proximity sensor is used (such as a Hall Effect sensor), proximity sensing may be activated at all times. In block 712, it is determined whether the case is open. For example, the one or more processors 140 may receive detection data from the proximity sensor 160 indicating whether the case 100 is open.

In block 714, if it was detected that the case was not open, capacitive sensing is deactivated. For example, if the capacitive sensing circuitry 120 had previously been activated, the one or more processors 140 can generate a control signal to deactivate the capacitive sensing circuitry 120 upon receiving detection data indicating that the case was closed; if the capacitive sensing circuitry 120 had not been activated, the one or more processors 140 need not do anything further. Conversely, in block 716, if it was detected that the case was open, capacitive sensing is activated. For example, if the capacitive sensing circuitry 120 had previously been deactivated, the one or more processors 140 can generate a control signal to activate the capacitive sensing circuitry 120 upon receiving detection data indicating that the case was opened; if the capacitive sensing circuitry 120 had not been deactivated, the one or more processors 140 need not do anything further.

In block 720, it is determined whether a device is in the case. For example, if the case 100 is open and capacitive sensing circuitry 120 is activated (block 716), the one or more processors 140 may receive detection data from capacitive sensing circuitry 120 indicating whether the wireless device 180 is inside the case 100. As another example, if the case 100 is closed and capacitive sensing circuitry 120 is deactivated (block 714), the one or more processors 140 may look at previous detection data saved in memory indicating whether the wireless device 180 had been detected in the case 100.

In block 722, if it was detected that the device was not in the case, the electrical component is disabled. For example, the one or more processors 140 may generate a control signal that is a high-impedance signal (high-Z state of tristate logic gate) to the electrical component 110, thereby disabling the electrical component 110. Thereafter, the case continues to monitor whether the case is opened (block 712) and repeat any steps described above as necessary. Conversely, in block 724, if it was detected that the device was in the case, the case pings the device for its charge status. For example, the one or more processors 140 may generate a control signal to transceiver 150 to initiate communication with the wireless device 180.

In block 730, it is determined whether the device responds to communication. For example, the one or more processors 140 may generate a control signal to transceiver 150 to receive data from the wireless device 180.

In block 732, if the device did not respond to communication, the case charges the device. For example, the one or more processors 140 may receive no data from the transceiver 150, and assumes that the wireless device 180 did not respond to communication initiated by the transceiver 150. The one or more processors 140 may assume that the failure to respond is because the wireless device 180 is completely discharged, and thus generate a control signal to enable charging of the wireless device 180. Thereafter, the case continues to ping the device (block 724) to see whether the device can respond to communication, and repeat any steps described above as necessary.

Conversely, in block 734, if the device responds to communication, it is determined whether the device is sufficiently charged. For example, the transceiver 150 may receive charge status from the wireless device 180, and report to the one or more processors 140, the one or more processors 140 may determine whether the charge status is fully charged, or alternatively at or above a predetermined sufficient charge threshold (such as 70% charged, 80% charged, etc.). If it is determined that the device is not sufficiently charged, the case charges the device (block 732). Otherwise, in block 736, if it is determined that the device is sufficiently charged, the case does not charge the device. For example, the one or more processors 140 generates a control signal to disable charging of the wireless device 180. Further, the electrical component is disabled (block 722). Thereafter, the case continues to monitor whether the case is opened (block 712) and repeat any steps described above as necessary, including detecting whether the device is in the case, and whether the device is sufficiently charged.

Although this example only shows controlling sensing and charging based on detection data and data received from the device, any of a number of other data may also be used to control sensing and charging. For example, a user may manually enable and disable sensing and charging, such as via a user input of the case (such as user interface 640). In other examples, whether various sensing, communication, and charging capabilities, and/or the electrical component are disabled or enabled may depend on a charge status of the case itself. For example, one or more sensing, communication, and charging capabilities may be turned off when the case has a predetermined critically low charge status (such as less than 10% charged, 5% charged, or another low charge level). In still other examples, whether various sensing, communication, and charging capabilities, and/or the electrical component are disabled or enabled may depend on whether the case is in standby state, active state, or factory mode. For example, one or more sensing, communication, and charging capabilities may be turned off when the case is in standby state or factory mode.

Figure 8:
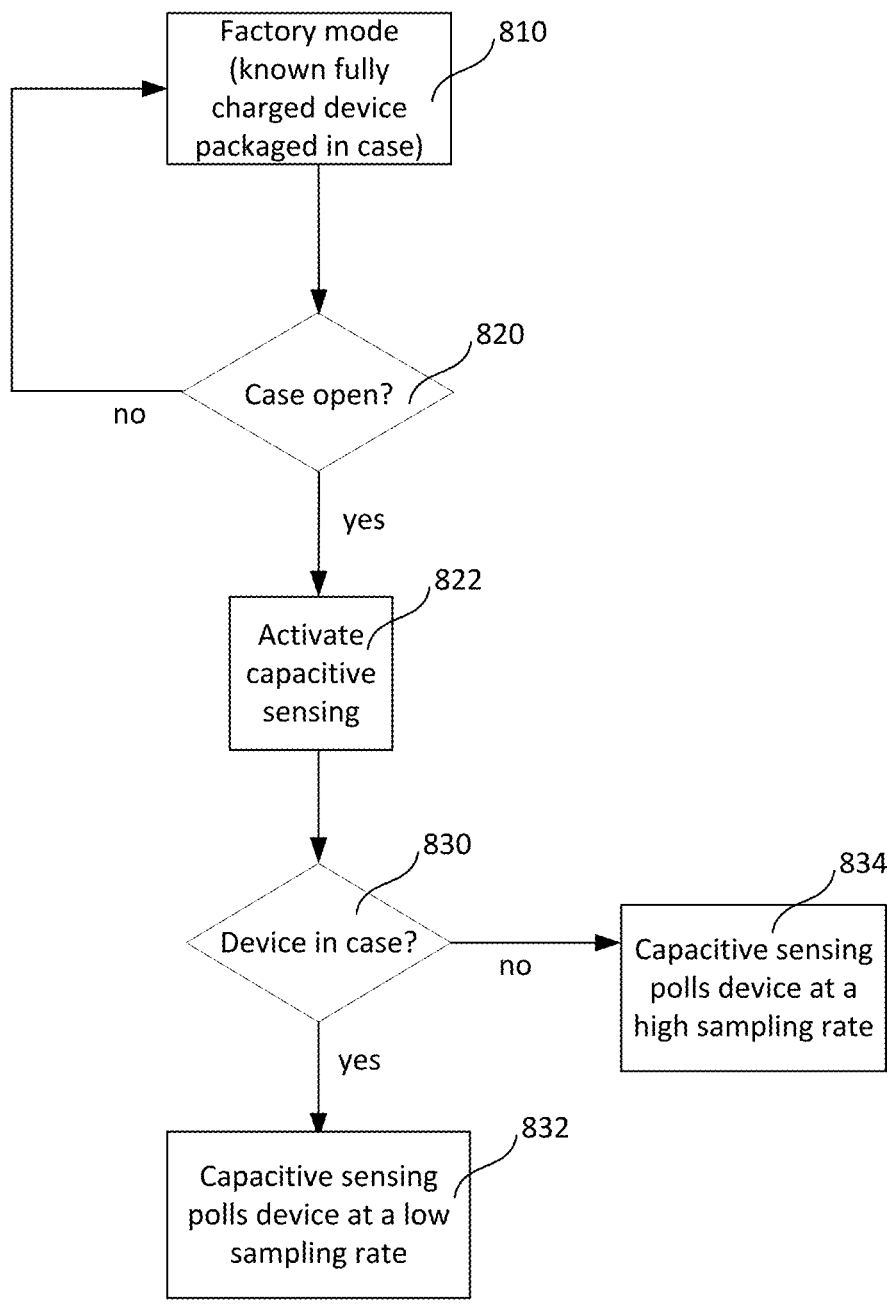
FIG. 8 is an example flow diagram illustrating another example method in accordance with aspects of the disclosure.

FIG. 8 provides an example flow diagram illustrating an example method 800 for controlling a capacitive sensing circuitry in a case for detecting a presence of a wireless device. For example, the one or more processors 140 of case 100 or 100A shown in FIGS. 1 and 3-5 may be used to control the capacitive sensing circuitry 120 according to the method 700. For example, the processors 140 may control the capacitive sensing circuitry 120 based on detections from the proximity sensor 160 and the capacitive sensing circuitry 120.

In block 810, the case is in factory mode—where a fully charged device is packaged in the case. For example, in this initial state, most or all components of the case may be in an inactive or standby state, such as capacitive sensing circuitry 120, transceiver 150, electrical component 110, and charging capabilities. In this example, only the proximity sensor 160 may be active in this factory mode to detect whether the case 100 opens (indicating that the case 100 has reached a user, who may take the packaged device 180 out of the case 100).

In block 820, it is determined whether the case is open. For example, the one or more processors 140 may receive detection data from the proximity sensor 160 indicating whether the case 100 is open. If the case is not open, the case remains in factory mode (block 810). However, in block 822, if it is determined that the case is opened, capacitive sensing is activated. For example, the one or more processors 140 can generate a control signal to activate the capacitive sensing circuitry 120 upon receiving detection data indicating that the case was opened.

In block 830, it is determined whether the device is in the case. For example, the one or more processors 140 may receive detection data from capacitive sensing circuitry 120 indicating whether the wireless device 180 is inside the case 100. If the device is in the case, in block 832, capacitive sensing polls at a low sampling rate. For example, the one or more processors 140 may receive detection data that the wireless device 180 is in the case 100, and assumes that either the user wants the case to charge the wireless device 180 or to store the device for some period of time, and therefore generates a control signal to the capacitive sensing circuitry 120 to poll at a predetermined low sampling rate (such as 1 kHz-10 kHz). Conversely, if the device is not in the case, in block 834, capacitive sensing polls at a high sampling rate. For example, the one or more processors 140 may receive detection data that the wireless device 180 is not in the case 100, and assumes that once the user returns the wireless device 180 to the case 100, some action (such as charging) may be needed right away, thus, the one or more processors 140 may generates a control signal to the capacitive sensing circuitry 120 to poll at a predetermined high sampling rate (such as up to 100 kHz).

Although this example only shows controlling the sampling rate of capacitive sensing based on whether the device is detected in the case, sampling rate of capacitive sensing can be alternatively or additionally set based on other factors, such as whether the case is in standby state/factory mode (low sampling rate) or active state (high sampling rate), whether the case is open (high sampling rate) or closed (low sampling rate), and/or whether the case has a predetermined critically low charge (low sampling rate) or not (high sampling rate).

Figure 9:
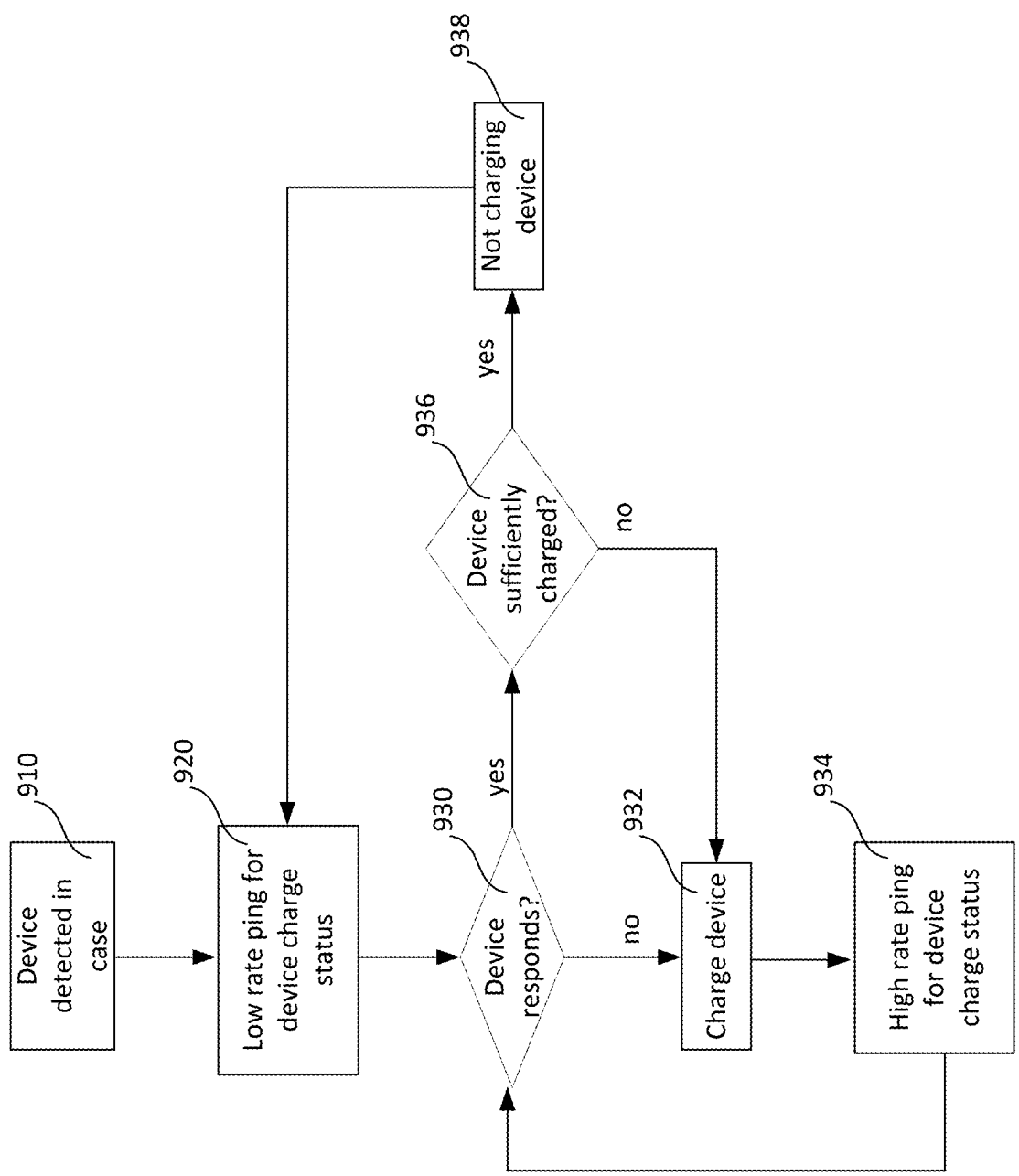
FIG. 9 is an example flow diagram illustrating another example method in accordance with aspects of the disclosure.

FIG. 9 provides an example flow diagram illustrating an example method 900 for controlling communication between a case and a wireless device. For example, the one or more processors 140 of case 100 or 100A shown in FIGS. 1 and 3-5 may be used to control the transceiver 150 according to the method 900. For example, the processors 140 may control the transceiver 150 based on detections from the proximity sensor 160, the capacitive sensing circuitry 120, and the data received by the transceiver 150.

In block 910, the device is detected inside the case. For example, if capacitive sensing circuitry 120 is activated, the one or more processors 140 may receive detection data from capacitive sensing circuitry 120 indicating that the wireless device 180 is inside the case 100. As another example, if the capacitive sensing circuitry 120 is deactivated, the one or more processors 140 may look at previous detection data saved in memory indicating that the wireless device 180 had been detected in the case 100.

In block 920, the case pings the device at a low rate for its charge status. For example, the one or more processors 140 may generate a control signal to transceiver 150 to ping the wireless device 180 at a predetermined low communication rate (such as 1 Hz-10 Hz).

In block 930, it is determined whether the device responds to communication. For example, the one or more processors 140 may generate a control signal to transceiver 150 to receive data from the wireless device 180.

In block 932, if the device did not respond to communication, the case charges the device. For example, the one or more processors 140 may receive no data from the transceiver 150, and assumes that the wireless device 180 did not respond to communication initiated by the transceiver 150. The one or more processors 140 may assume that the failure to respond is because the wireless device 180 is completely discharged, and thus generate a control signal to enable charging of the wireless device 180. Then, in block 934, the case pings the device at a high rate for its charge status. For example, the one or more processors 140 may generate a control signal to transceiver 150 to ping the wireless device 180 at a predetermined high communication rate (such as up to 100 Hz). Thereafter, the case continue to actively monitor whether the device can respond to communication (block 932), and repeat any steps described above as necessary. In this regard, the high rate may be determined by an amount of time it would take to charge the completely discharged wireless device 180 to a predetermined minimal charge threshold—such as an amount that enables the wireless device 180 to respond to communication.

In block 936, if the device responded to communication, it is determined whether the device is sufficiently charged. For example, the transceiver 150 may receive charge status from the wireless device 180, and report to the one or more processors 140, the one or more processors 140 may determine whether the charge status is fully charged, or alternatively at or above a predetermined sufficient charge threshold (such as 80% charged, 70% charged, etc.). If it is determined that the device is not sufficiently charged, the case charges the device (block 932). Otherwise, in block 938, if it is determined that the device is sufficiently charged, the case does not charge the device. For example, the one or more processors 140 generates a control signal to disable charging of the wireless device 180. Thereafter, the case continues to ping the device at a low rate for its charge status (block 920), and repeat any steps described above as necessary. In this regard, the low rate may be determined by an amount of time it would take for all or a predetermined amount of charges to drain from the wireless device 180.

Although this example only shows controlling a communication rate based on whether the device responds to communication and a charge status of the device, communication rate can be set additionally based on other factors, such as whether the device is in factory mode (low communication rate) or working mode (high communication rate). Further, communication rate may be further based on a status of the case, such as whether the case is in standby state/factory mode (low communication rate) or active state (high communication rate), whether the case is open (high communication rate) or closed (low communication rate), whether the case has a predetermined critically low charge (low communication rate) or not (high communication rate).

FIG. 10 provides an example flow diagram illustrating an example method 1000 for controlling charging of a wireless device in a case. For example, the one or more processors 140 of case 100 or 100A shown in FIGS. 1 and 3-5 may be used to control charging the wireless device 180 according to the method 1000. For example, the case 100 or 100A may control charging based on detections from capacitive sensing circuitry 120 and proximity sensor 160, and data received from transceiver 150.

In block 1010, the device is detected inside the case. For example, if capacitive sensing circuitry 120 is activated, the one or more processors 140 may receive detection data from capacitive sensing circuitry 120 indicating that the wireless device 180 is inside the case 100. As another example, if the capacitive sensing circuitry 120 is deactivated, the one or more processors 140 may look at previous detection data saved in memory indicating that the wireless device 180 had been detected in the case 100.

In block 1020, the case pings the device for its charge status. For example, the one or more processors 140 may generate a control signal to transceiver 150 to ping the wireless device 180.

In block 1030, it is determined whether the device responds to communication. For example, the one or more processors 140 may generate a control signal to transceiver 150 to receive data from the wireless device 180.

In block 1032, if the device did not respond to communication, the case charges the device. For example, the one or more processors 140 may receive no data from the transceiver 150, and assumes that the wireless device 180 did not respond to communication initiated by the transceiver 150. The one or more processors 140 may assume that the failure to respond is because the wireless device 180 is completely discharged, and thus generate a control signal to enable charging of the wireless device 180. Then, the case continues to ping the device for its charge status (block 1020). Thereafter, the case continues to monitor whether the wireless device can respond to communication (block 1030), and repeat any steps described above as necessary.

In block 1040, if the device responds to communication, it is determined whether the case has a critically low charge. For example, this is because the case 100 is configured to handle wireless device even if it is completely discharged and unable to communicate, however, the case 100 cannot do so if it is completely discharged itself. Therefore, the case 100 may be further configured to conserve energy when its charge status is at a predetermined critically low level. For instance, the predetermined critically low charge may be a predetermined value, such as 10% charged, 5% charged, or another low charge level.

In block 1042, if the case has a critically low charge, it is determined whether the device has a charge at or above a minimal charge threshold. For example, the transceiver 150 may receive charge status from the wireless device 180, and report to the one or more processors 140, the one or more processors 140 may determine whether the charge status is at or above a predetermined minimal charge threshold. For example, the predetermined minimal charge threshold may be the amount of charge needed for the wireless device 180 to turn on or transmit its charge status. In block 1044, if it is determined that the device has a charge at or above the minimal charge threshold, the case does not charge the device. For example, the one or more processors 140 may generate a control signal to disable charging of the wireless device 180. Thereafter, though not shown, the case continues to ping the device for its charge status (block 1020). If, however, it is determined that the device has a charge below the minimal charge threshold, the case charges the device (block 1032).

Conversely, in block 1046, if it was determined that the case does not have a critically low charge, it is further determined whether the device is sufficiently charged. For example, the transceiver 150 may receive charge status from the wireless device 180, and report to the one or more processors 140, the one or more processors 140 may determine whether the charge status is fully charged, or alternatively at or above a predetermined sufficient charge threshold (such as 80% charged, 70% charged, etc.). If it is determined that the device is not sufficiently charged, the case charges the device (block 1032). Otherwise, if it is determined that the device is sufficiently charged, the case does not charge the device (block 1044). Thereafter, though not shown, the case continues to ping the device for its charge status (block 1020).

Although this example only shows controlling charging based on a charge status of the device and a charge status of the case, charging may further be controlled additionally based on other factors, such as whether the device is in factory mode (not charging) or working mode (charging), and whether the device had been positioned in the case for an extended period of time (assumed to be discharged).

The technology is advantageous because it provides a case for smart and efficient charging of wireless devices. Using capacitive sensing, the case can detect the wireless devices inside even if they are completely discharged or powered off. The case also provides for two way communication between the case and the wireless devices inside to better manage efficient charging. Further, energy may be conserved by adjusting the sampling rate of capacitive sensing and the communication rate of the transceiver, as well as by selectively turning on and off capacitive sensing and communication. Energy may be further conserved by controlling an extent to charge the wireless devices. Still further, the case uses high impedance signals to deactivate unnecessary signal/power lines to further reduce energy loss and corrosion.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted

The invention claimed is:

1. A case configured for charging one or more wireless devices, the case comprising:
   capacitive sensing circuitry configured for detecting whether the one or more wireless devices are positioned inside the case;
   a transceiver configured for transmitting data to and receiving data from the one or more wireless devices;
   an electrical component operatively connected to the capacitive sensing circuitry and to the transceiver, wherein, when the one or more wireless devices are positioned inside the case, the electrical component is configured to operatively connect the capacitive sensing circuitry and the transceiver to the one or more wireless devices; and
   one or more processors configured to control the capacitive sensing circuitry, the transceiver, and the electrical component;
   wherein the one or more processors are configured to:
      determine whether to charge the one or more wireless devices based on a detection of the capacitive sensing circuitry and data received by the transceiver, and
      set a sampling rate of the capacitive sensing circuitry based at least on the position of the one or more wireless devices relative to the case.

2. The case of claim 1, further comprising:
   a sensor configured to detect whether the case is open or closed;
   wherein the one or more processors are configured to activate the capacitive sensing circuitry when the case is detected to be open and deactivate the capacitive sensing circuitry when the case is detected to be closed.

3. The case of claim 1, wherein the one or more processors are further configured to set the sampling rate of the capacitive sensing circuitry to a predetermined low sampling rate when the one or more wireless devices are detected to be positioned inside the case, and set the sampling rate of the capacitive sensing circuitry to a predetermined high sampling rate when the one or more wireless devices are not detected to be positioned inside the case.

4. The case of claim 1, wherein, when the one or more wireless devices are detected by the capacitive sensing circuitry as being inside the case, the one or more processors are configured to enable communication by activating the transceiver and the electrical component for transmitting data to or receiving data from the one or more wireless devices.

5. The case of claim 4,
   wherein the data received by the transceiver includes whether the one or more wireless devices are in a working mode or a factory mode;
   wherein the one or more processors are configured to set a communication rate of the transceiver to a predetermined high communication rate when the one or more wireless devices are in a working mode, and set the communication rate of the transceiver to a predetermined low communication rate when the one or more wireless devices are in a factory mode.

6. The case of claim 4, wherein the one or more processors are configured to control the transceiver to initiate communication with the one or more wireless devices when detection data from the capacitive sensing circuitry indicate that the one or more wireless devices have been positioned inside the case for a predetermined period of time.

7. The case of claim 1,
   wherein the data received by the transceiver includes a charge status of the one or more wireless devices; and
   wherein the one or more processors are configured to set a communication rate of the transceiver to a predetermined high communication rate when the charge status indicates that the one or more wireless devices are below a predetermined sufficient charge threshold, and set the communication rate of the transceiver to a predetermined low communication rate when the charge status indicates that the one or more wireless devices are at or above the predetermined sufficient charge threshold.

8. The case of claim 1,
   wherein the data received by the transceiver includes a charge status of the one or more wireless devices; and
   wherein the one or more processors are configured to set a communication rate of the transceiver to a predetermined high communication rate while the one or more wireless devices are being charged inside the case, and set the communication rate of the transceiver to a predetermined low communication rate while the one or more wireless devices are not being charged inside the case.

9. The case of claim 4, wherein, when the one or more wireless devices do not respond to communication, the one or more processors are configured to activate charging for the one or more wireless devices.

10. The case of claim 1,
    wherein the data received by the transceiver includes a charge status of the one or more wireless devices; and
    wherein, when the charge status indicates that the one or more wireless devices are below a predetermined sufficient charge threshold, the one or more processors are configured to activate charging for the one or more wireless devices.

11. The case of claim 10, wherein the one or more processors are configured to determine that a charge status of the case is below a predetermined critically low charge threshold, and to stop charging of the one or more wireless devices when the one or more wireless devices are charged to a predetermined minimal charge threshold.

12. The case of claim 1, further comprising:
    a sensing line operatively connecting the capacitive sensing circuitry to the electrical component; and
    an input/output line connecting the one or more processors to the electrical component;
    wherein the input/output line at least partially overlaps the sensing line.

13. The case of claim 12, wherein the one or more processors is configured to deactivate the electrical component by sending a high-impedance signal to the input/output line.

14. The case of claim 12, further comprising:
    a pull-up resistor operatively connecting an output of the one or more processors to the electrical component and operatively connecting the capacitive sensing circuitry to the electrical component;
    a pull-down resistor connecting the electrical component to a ground, the ground being shared with the one or more wireless devices; and
    wherein the pull-down resistor has a resistance value at least one order of magnitude greater than the pull-up resistor.

15. A system, comprising:
a case for charging one or more wireless devices, comprising:
- capacitive sensing circuitry configured for detecting whether the one or more wireless devices are positioned inside the case;
- a first transceiver configured for transmitting data to and receiving data from the one or more wireless devices;
- an electrical component operatively connected to the capacitive sensing circuitry and to the transceiver, wherein, when the one or more wireless devices are positioned inside the case, the electrical component is configured to operatively connect the capacitive sensing circuitry and the transceiver to the one or more wireless devices; and
- one or more processors configured to control the capacitive sensing circuitry, the transceiver, and the electrical component;
- wherein the one or more processors are configured to:
  - determine whether to charge the one or more wireless devices based on a detection of the capacitive sensing circuitry and data received by the transceiver, and
  - set a sampling rate of the capacitive sensing circuitry based at least on the position of the one or more wireless devices relative to the case; and
- the one or more wireless devices, comprising: a second transceiver for transmitting data to and receiving data from the case.

16. The system of claim 15, wherein the one or more wireless devices further comprise:
- a second capacitive sensing circuitry configured to detect whether the one or more wireless devices are positioned inside the case;
- wherein, when the second capacitive sensing circuitry detects that the one or more wireless devices are positioned inside the case, the second transceiver of the one or more wireless devices are configured to initiate communication with the first transceiver of the case.

17. The system of claim 15, wherein the one or more processors are further configured to:
- set the sampling rate of the capacitive sensing circuitry to a predetermined low sampling rate when the one or more wireless devices are detected to be positioned inside the case, and
- set the sampling rate of the capacitive sensing circuitry to a predetermined high sampling rate when the one or more wireless devices are not detected to be positioned inside the case.

18. A method for charging one or more wireless devices by a case, the method comprising:
- activating, by one or more processors, capacitive sensing circuitry to detect whether the one or more wireless devices are positioned inside the case
- setting, by the one or more processors, a sampling rate of the capacitive sensing circuitry based at least on the position of the one or more wireless devices relative to the case;
- activating, by the one or more processors, a transceiver to initiate communication between the case and the one or more wireless devices upon detecting that the one or more wireless devices are positioned inside the case;
- receiving, from the one or more wireless devices, a charge status of the one or more wireless devices; and
- determining, by the one or more processors, whether to charge the one or more wireless devices based on the charge status of the one or more wireless devices.

19. The method of claim 18, further comprising:
- activating, by the one or more processors, a sensor for detecting whether the case is open or closed; and
- adjusting, by the one or more processors, a sampling rate of the capacitive sensing circuitry based on whether the case is open or closed.

20. The method of claim 18, wherein setting the sampling rate comprises:
- setting the sampling rate of the capacitive sensing circuitry to a predetermined low sampling rate when the one or more wireless devices are detected to be positioned inside the case; and
- setting the sampling rate of the capacitive sensing circuitry to a predetermined high sampling rate when the one or more wireless devices are not detected to be positioned inside the case.

* * * * *